United States Patent
Moner

(10) Patent No.: US 6,908,114 B2
(45) Date of Patent: Jun. 21, 2005

(54) PRE-ASSEMBLABLE, PUSH-IN FITTING CONNECTION FOR CORRUGATED TUBING

(75) Inventor: Ronald A. Moner, Twinsburg, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/436,593

(22) Filed: May 13, 2003

(65) Prior Publication Data

US 2004/0155463 A1 Aug. 12, 2004

Related U.S. Application Data

(60) Provisional application No. 60/446,316, filed on Feb. 7, 2003.

(51) Int. Cl.[7] .............................................. F16L 33/00
(52) U.S. Cl. ........................ 285/23; 285/249; 285/324; 285/903
(58) Field of Search ............................ 285/23, 92, 245, 285/247, 249, 903, 322–324

(56) References Cited

U.S. PATENT DOCUMENTS

| | | | |
|---|---|---|---|
| 96,914 A | 11/1869 | Hill | |
| 163,588 A | 5/1875 | Goodall | |
| 178,313 A | 6/1876 | Leland | |
| 262,581 A | 8/1882 | Doolittle | |
| 546,314 A | 9/1895 | Farrey | |
| 1,969,531 A | * 8/1934 | Swedler et al. | ........... 285/92 X |
| 2,112,238 A | 3/1938 | Guarnaschelli | |
| 2,113,211 A | 4/1938 | Lake | |
| 2,172,532 A | 9/1939 | Fentress | |
| 2,226,039 A | 12/1940 | Wiltse | |
| 2,323,912 A | 7/1943 | Johnson | |
| 2,357,669 A | 9/1944 | Lake | |
| 2,363,586 A | 11/1944 | Guarnaschelli | |
| 2,424,727 A | 7/1947 | Wenk | |
| 2,430,657 A | 11/1947 | Zolleis | |

(Continued)

FOREIGN PATENT DOCUMENTS

| | | |
|---|---|---|
| DE | 26 27 397 | 12/1977 |
| DE | 3508198 A1 | 9/1985 |
| EP | 0331116 | 9/1989 |
| EP | 0381981 | 8/1990 |
| EP | 0545410 | 6/1993 |
| FR | 2589979 | 5/1987 |
| GB | 1371609 | 10/1974 |
| GB | 2241547 | 9/1991 |
| JP | 4-125389 | 4/1992 |
| JP | 6-11084 | 1/1994 |
| RU | 1742571 A1 | 6/1992 |
| WO | WO 98/06970 | 2/1998 |
| WO | wo 99/06750 | 11/1999 |

OTHER PUBLICATIONS

Parker Fluid Connectors Bulletin No. 4660–PGP1, Design and Installation Guide for Parker Gas Piping, Flexibl Fuel Gas Piping System, dated Aug., 2000.

(Continued)

Primary Examiner—Greg Binda
(74) Attorney, Agent, or Firm—John A. Molnar, Jr.

(57) ABSTRACT

Fitting connections for corrugated metal tubing. The connection includes a body having an externally-threaded end, a nut or other fastener which is threadably engageable with the body end, and a collet which is receivable coaxially within the fastener. The collet is formed as a series of individual, arcuate tangs which are joined together by a retaining collar, the collar allowing the segments to be resiliently opened within the fastener so as to allow the crests of the tubing to pass therethrough. The fitting may be pre-assembled with the collet segments being received coaxially within the fastener with the collar extending rearwardly from the fastener, and with the fastener then being partially threaded onto the fitting body.

28 Claims, 13 Drawing Sheets

U.S. PATENT DOCUMENTS

| | | | |
|---|---|---|---|
| 2,495,149 A | 1/1950 | Cahenzli, Jr. | |
| 2,497,273 A | 2/1950 | Richardson | |
| 2,503,826 A | 4/1950 | Lamont | |
| 2,549,741 A | 4/1951 | Young | |
| 2,687,904 A | 8/1954 | Tornblon | |
| 2,848,254 A | 8/1958 | Millar | |
| 2,858,147 A | 10/1958 | Guarnaschelli | |
| 2,946,607 A | 7/1960 | Bauer | |
| 2,991,093 A | 7/1961 | Guarnaschelli | |
| 3,008,736 A | 11/1961 | Samiran | |
| 3,112,937 A | 12/1963 | William | |
| 3,214,200 A | 10/1965 | Carlson et al. | |
| 3,218,094 A | * 11/1965 | Bauer | 285/249 |
| 3,294,426 A | 12/1966 | Lyon | |
| 3,306,637 A | 2/1967 | Press et al. | |
| 3,381,980 A | 5/1968 | Smith | |
| 3,429,596 A | 2/1969 | Marshall | |
| 3,454,290 A | 7/1969 | Tairraz | |
| 3,888,522 A | 6/1975 | Moreiras | |
| 3,907,355 A | 9/1975 | Burge et al. | |
| 4,032,177 A | * 6/1977 | Anderson | 285/249 X |
| 4,046,451 A | 9/1977 | Juds et al. | |
| 4,059,297 A | 11/1977 | Grahl et al. | |
| 4,073,512 A | 2/1978 | Vian et al. | |
| 4,124,235 A | 11/1978 | Grahl et al. | |
| 4,136,897 A | 1/1979 | Haluch | |
| 4,302,036 A | 11/1981 | Burge | |
| 4,423,891 A | 1/1984 | Menges | |
| 4,630,850 A | 12/1986 | Saka | |
| 4,669,761 A | 6/1987 | Huling | |
| 4,674,775 A | 6/1987 | Tajima et al. | |
| 4,801,158 A | 1/1989 | Gumi | |
| 4,867,489 A | 9/1989 | Patel | |
| 4,872,710 A | 10/1989 | Konecny et al. | |
| 4,904,002 A | 2/1990 | Sasa et al. | |
| 4,907,830 A | 3/1990 | Sasa et al. | |
| 4,909,547 A | 3/1990 | Guy | |
| 5,024,468 A | 6/1991 | Burge | |
| 5,080,405 A | 1/1992 | Sasa et al. | |
| 5,131,145 A | 7/1992 | Badoureaux | |
| 5,226,682 A | 7/1993 | Marrison et al. | |
| 5,261,707 A | 11/1993 | Kotake et al. | |
| 5,292,156 A | 3/1994 | Sasa et al. | |
| 5,354,108 A | 10/1994 | Sandor | |
| 5,356,181 A | 10/1994 | Shirogane et al. | |
| 5,413,147 A | 5/1995 | Moreiras et al. | |
| 5,423,578 A | 6/1995 | Kanomata et al. | |
| 5,441,312 A | 8/1995 | Fujiyoshi et al. | |
| 5,489,127 A | 2/1996 | Anglin et al. | |
| 5,543,582 A | 8/1996 | Stark et al. | |
| 5,553,893 A | 9/1996 | Foti | |
| 5,580,105 A | 12/1996 | Miller, Jr. et al. | |
| 5,622,394 A | 4/1997 | Soles et al. | |
| 5,799,989 A | 9/1998 | Albino | |
| 5,845,946 A | 12/1998 | Thomas | |
| 6,019,399 A | 2/2000 | Sweeney | |
| 6,036,237 A | 3/2000 | Sweeney | |
| 6,079,749 A | 6/2000 | Albino et al. | |
| 6,173,995 B1 | 1/2001 | Mau | |
| 6,428,052 B1 | 8/2002 | Albino et al. | |
| 6,764,107 B1 | 7/2004 | Obahi et al. | |

OTHER PUBLICATIONS

Titeflex Gastite Design and Installation Guide dated Apr. 1996.

OmegaFlex, Inc., Catalog TP1197, Tracpipe Runs Circles Around Black Iron Pipe (1997).

Ward Manufacturing, Rev. IV Jul. 1995, Wardflex A Gas Piping System for Today–and the 21$^{st}$ Century.

U.S. Appl. No. 60/446,316, filed Feb. 7, 2003, Ronald A. Moner.

* cited by examiner

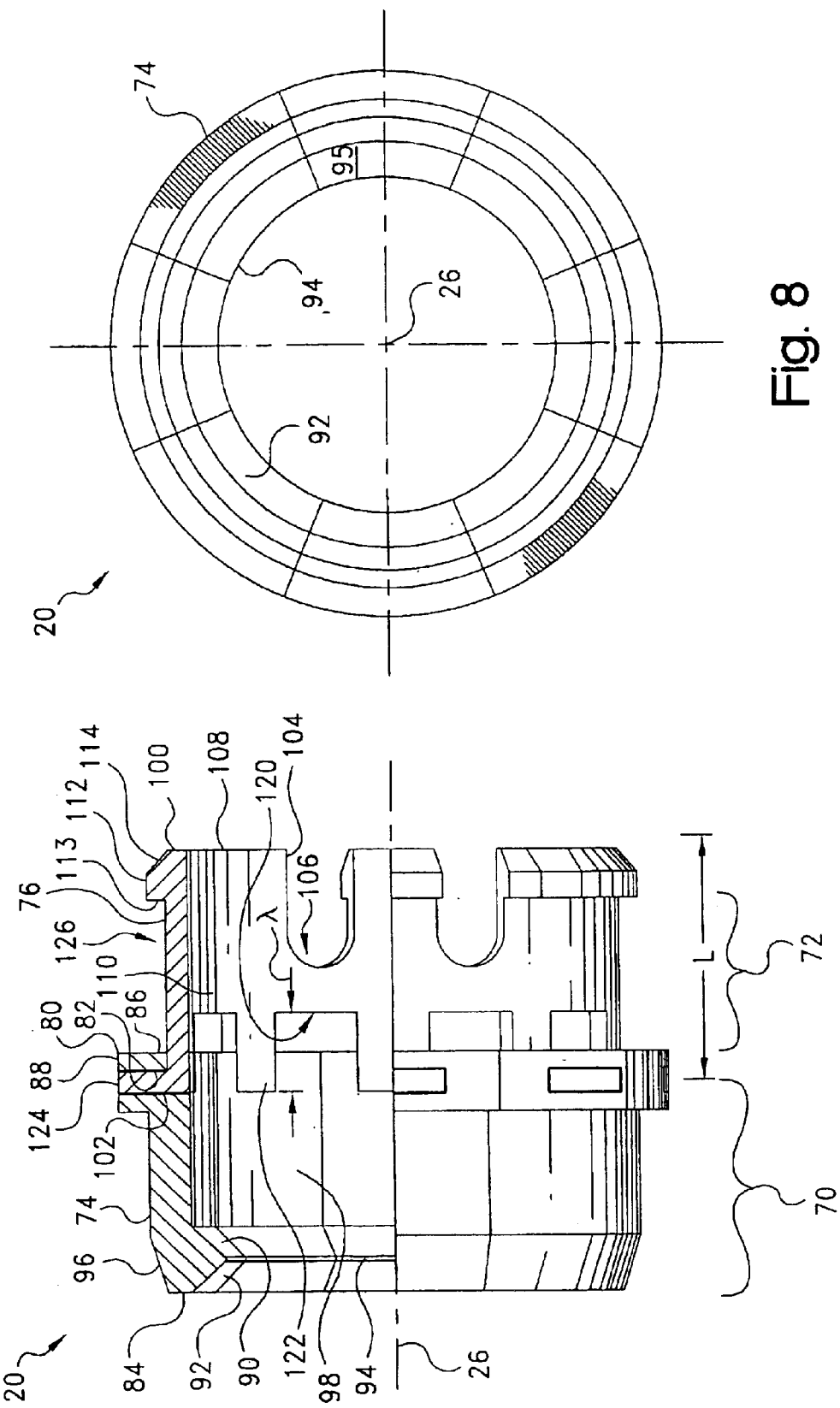

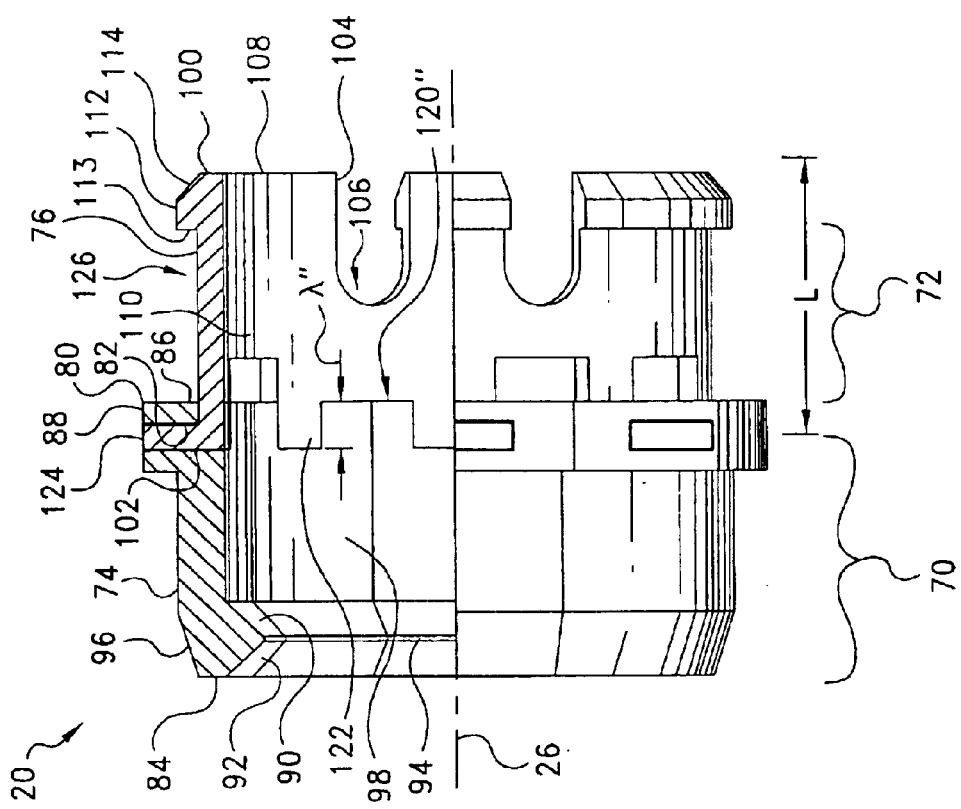
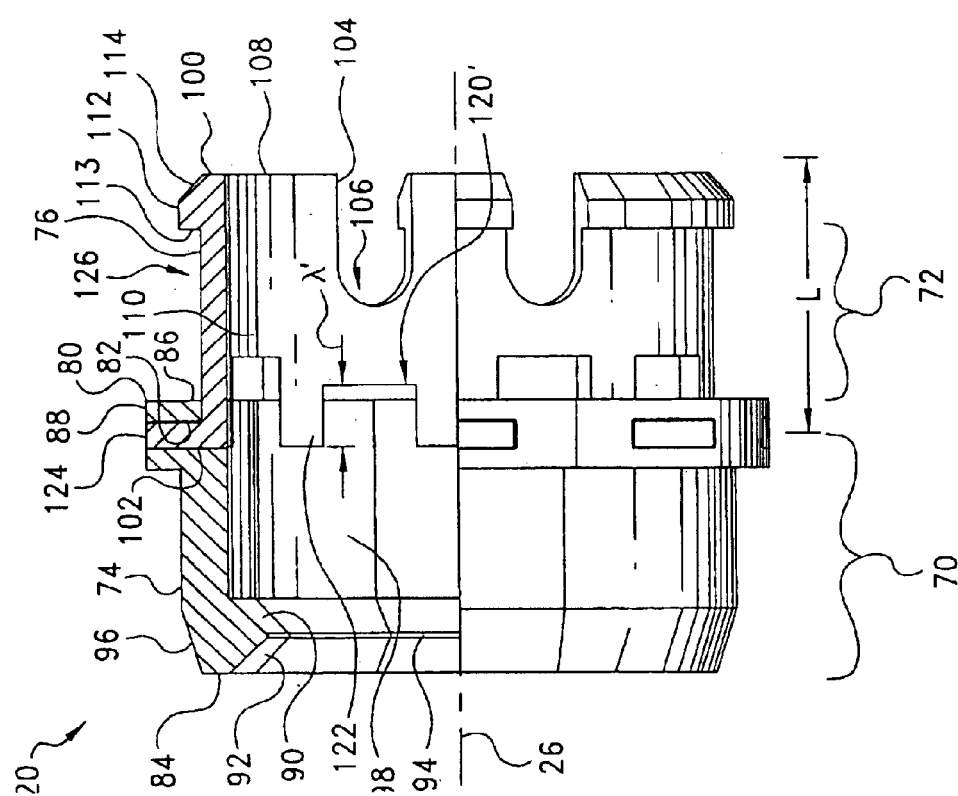

PRE-ASSEMBLABLE, PUSH-IN FITTING CONNECTION FOR CORRUGATED TUBING

CROSS-REFERENCE TO RELATED APPLICATIONS

The present application claims the benefit of the filing date of U.S. Provisional Application Ser. No. 60/446,316, filed Feb. 7, 2003, the disclosure of which is incorporated herein by reference.

BACKGROUND OF THE INVENTION

The present invention relates generally to fitting connections for coupling the end of a length of corrugated metal tubing to another member, and more particularly to such connections which are of a pre-assembled, push-in variety.

Corrugated metal tubing, often fabricated of stainless steel, copper, or the like and jacketed with a plastic material, is commonly employed in residential or commercial building constructions as a transitional fluid conduit extending between an appliance or other machine and a rigid auxiliary line, pipe, or other connection of a fuel source which may be natural gas, propane, or the like. The flexibility of such tubing facilitates the alignment of couplings and other connections, and also accommodates limited movement of the appliance or machine with respect to the rigid connection of the fuel source.

Recently, tubing of such type, and particularly corrugated stainless steel tubing ("CSST"), has been employed as a substitute for traditional hard, i.e., inflexible, steel or iron "black" pipe in gas line applications for residential and commercial construction. Advantageously, the flexibility of the tubing facilitates its installation through walls, ceilings, and floors and, especially, the alignment of the tubing connections. Such tubing, moreover, is lightweight, easy to carry, requires no threading or heavy equipment therefor, allows the use of fewer fitting connections, and exhibits less leak potential than conventional, hard piping. Corrugated tubing of the type herein involved additionally is used in other fluid transport applications such as in air conditioning, hydraulics, and general plumbing, and also as conduit for electrical applications. Tubing manufacturers include the Parflex Division of Parker-Hannifin Corp., Ravenna, Ohio, Titeflex Corp., Springfield, Mass., OmegaFlex, Inc., Exton, Pa., and Wardflex Manufacturing, Blossburg, Pa.

Compression and other fitting connections are commonly used in gas line and other applications. As is shown, for example, in commonly-assigned U.S. Pat. Nos. 6,036,237 and 6,019,399, in U.S. Pat. Nos. 6,428,052; 6,173,995; 6,079,749; 5,799,989; 5,441,312; 5,292,156; 5,226,682; 5,080,405; 4,904,002; 4,630,850; 4,674,775; 2,549,741; and 2,323,912, and in U.K. Patent No. 1,371,609, such connections typically involve a nut and an associated collet, split ring, ferrule, flare, C-ring or rings, bushing, sleeve, or other compression or locking member which is received in or over the tube end for holding the tube end within the nut as the nut is tightened onto a nipple, adapter, body, or other connector.

As the use of corrugated tubing in gas line and other fluid transfer applications continues to increase, it will be appreciated that further improvements in the design of fitting connections therefor would be well-received. A preferred design would be economical to manufacture, but would also simplify the assembly of the coupling while providing a connection which minimizes the potential for leaks and the like.

SUMMARY OF THE INVENTION

The present invention is directed to fitting connections for corrugated metal tubing, and more particularly to a connection which is of a pre-assembled, push-in variety. In an illustrated embodiment, the fitting connection includes a body having an externally-threaded end, a nut or other fastener which is threadably engageable with the body end, and a collet which is receivable coaxially within the fastener. The collet is formed in accordance with the precepts of the present invention as a series of individual, arcuate tangs which are joined together by a retaining collar, the collar allowing the segments to be resiliently opened, i.e., expanded, within the fastener so as to allow the crests of the tubing to pass therethrough. Advantageously, the fitting may be "pre-assembled," i.e., with the collet segments being received coaxially within the fastener with the collar extending rearwardly from the fastener, and with the fastener then being partially threaded onto the body.

In use, the tubing end may be inserted, i.e., "pushed-in," forwardly through the fastener and the collet disposing the forward ends of the collet tangs within one of the roots or valleys of the tubing, with the forward movement of the collet being delimited by the abutting engagement of a shoulder portion of the collet collar against the rearward end of the fastener. Thereupon, the fastener may be tightened urging the forward ends of the collet tangs, together with the retained tubing end, towards the sealing surface and flaring at least one of the tubing corrugations between the sealing surface and the forward end of the collet to thereby effect a fluid-tight sealing of the flared tubing end against the sealing surface. The seal thus may be obtained without having to pre-flare the tubing end.

The present invention, accordingly, comprises the article possessing the construction, combination of elements, and arrangement of parts which are exemplified in the detailed disclosure to follow. Advantages of the present invention include a fitting connection for corrugated tubing which simplifies assembly with better assurance that a leak-free connection is attained. Additional advantages include connection componentry which is economical to manufacture and easy to assemble. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 4 is a partially cross-sectional, side view of the collet of FIG. 3 taken through line 4–4 of FIG. 3;

FIG. 4A is a view as in FIG. 4 of an alternative embodiment of the collet of FIG. 4;

FIG. 4B is a view as in FIG. 4 of another alternative embodiment of the collet of FIG. 4;

FIG. 8 is a forward end view of the collet of FIG. 3;

Figure 1:
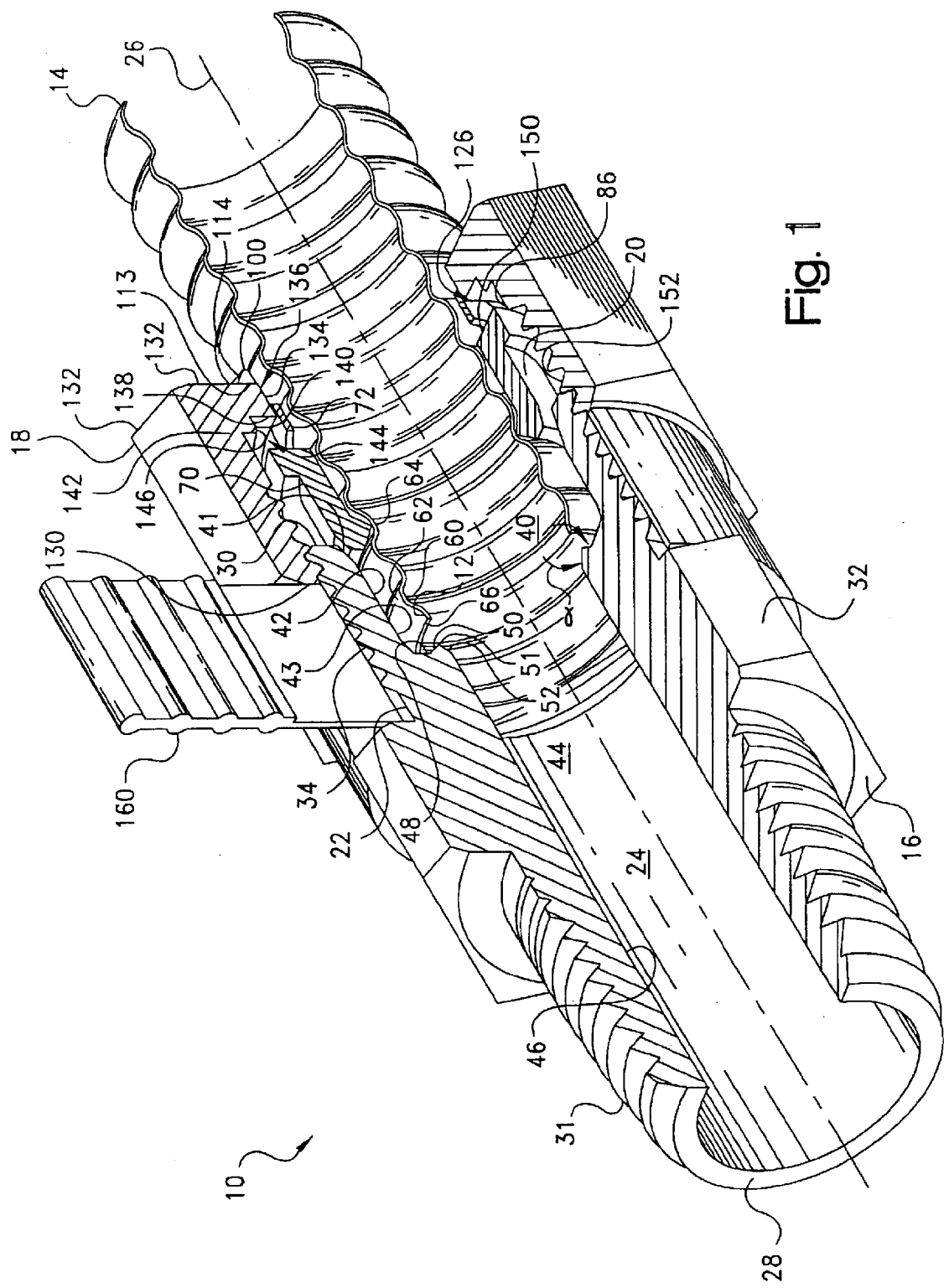
FIG. 1 is a cut-away, perspective view of a fitting connection assembly for corrugated tubing in accordance with the present invention.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left, upper" and "lower," "top" and "bottom," and "right" and "left" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "vertical" and "axial" or "horizontal" referring, respectively, to directions, axes, or planes perpendicular and parallel to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For the illustrative purposes of the discourse to follow, the precepts of the fitting connection for corrugated tubing involved are described in conjunction with a "straight" fitting and assembly therefor particularly adapted for use in gas line installations in residential or commercial construction. It is to be appreciated, however, that the present invention may find utility in many connector configurations, such as adapters, unions, tees, elbows, and crosses, and as integrated or other port connections for valves, cylinders, manifolds, sensors, and other fluid components, as well as in other applications utilizing corrugated tubing. Use within these and other configurations and applications therefore should be considered to be expressly within the scope of the invention herein involved.

Figure 2:
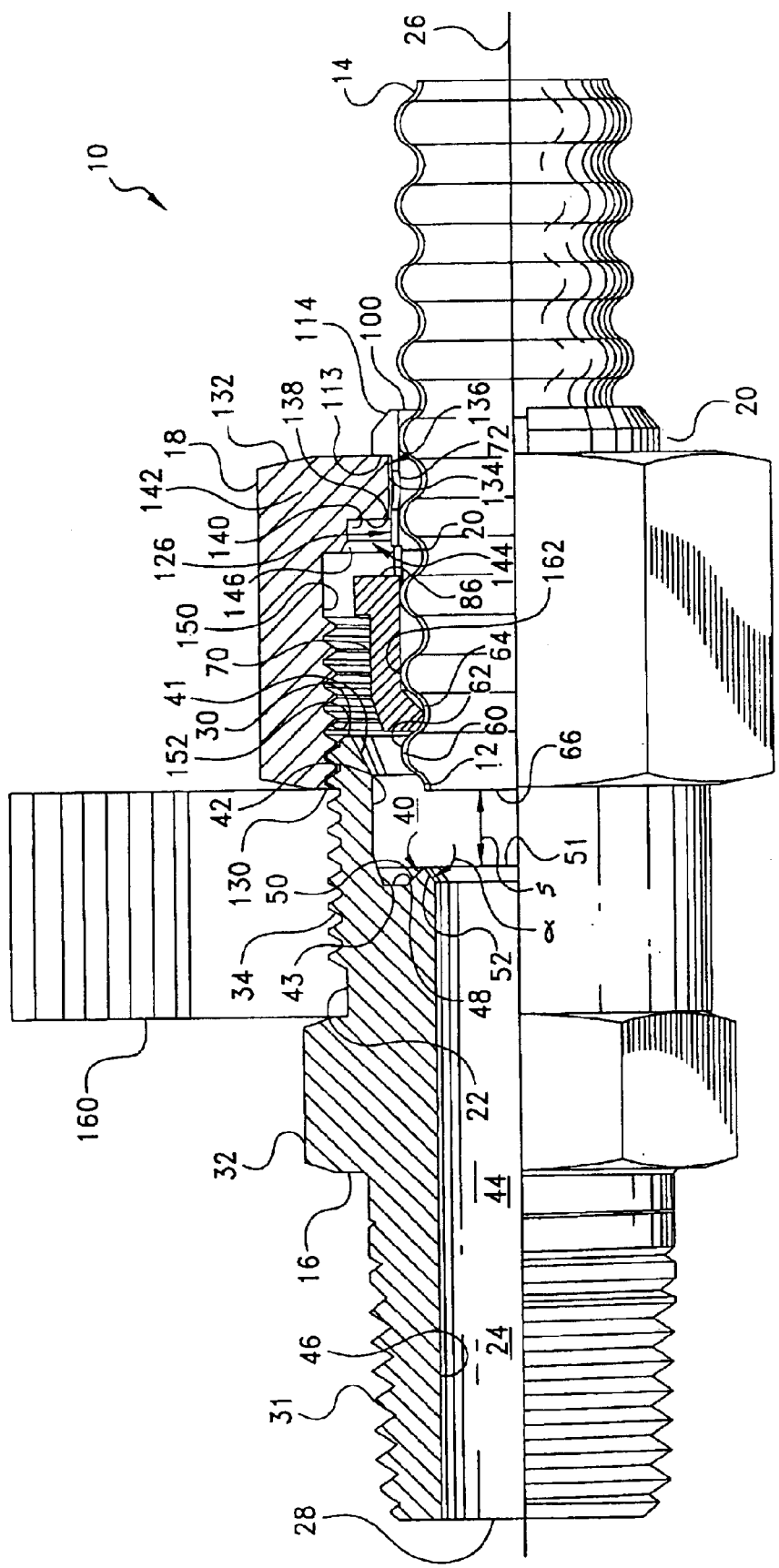
FIG. 2 is a partially cross-sectional, side view of the assembly of FIG. 1.

Referring then to the figures wherein corresponding reference characters are used to designate corresponding elements throughout the several views with equivalent elements being referenced with prime or sequential alphanumeric designations, a fitting connection in accordance with the present invention is shown generally at 10 in the perspective view of FIG. 1 and the side view of FIG. 2 as configured for connecting the distal end, 12, of a length of corrugated tubing, represented generally at 14, in fluid communication with a fitting body, represented generally at 16. In basic construction, fitting connection 10 also includes a fastener, 18, and a generally annular collet, 20, which is receivable coaxially within the fastener 18 and the fitting body 16.

Body 16, in the "straight" configuration shown, such as for a union or a reducer or other adapter, is generally tubular in having an external surface, 22, and an internal axial throughbore, referenced at 24, and in extending coaxially with a central longitudinal axis, 26, intermediate a forward end, 28, and a rearward end, 30. Of course, by providing body 16 as having ends or branches which are angled, or as having multiple ends or branches, configurations other than straight, such as elbows, tees, or crosses may be provided. Forward end 28 is shown in FIGS. 1 and 2 to be threaded at 31 for a male threaded pipe connection, and in that regard, the body external surface 22 may be configured as at 32 as having hexagonal or other flats portions for engagement with a wrench or other tool during make-up or disassembly, with the body rearward end 30 being externally threaded as shown at 34. Forward end 28 alternatively may be configured instead for a female threaded pipe connection, or for a tube, welded or other connection. Body 16 also itself may be a manifold, valve, piston, or other component or structure. By way of convention, axial directions along axis 26, which for purposes of convenience will be used as a common reference axis for each of the components as arranged for the assembly of connection 10, will be referred to as "forward," "forwardly," or "front" if in the direction of or towards or adjacent the body forward end 28, and as "rearward," "rearwardly," or "rear" if in the opposite direction of or towards or adjacent the body rearward end 30.

Figure 2A:
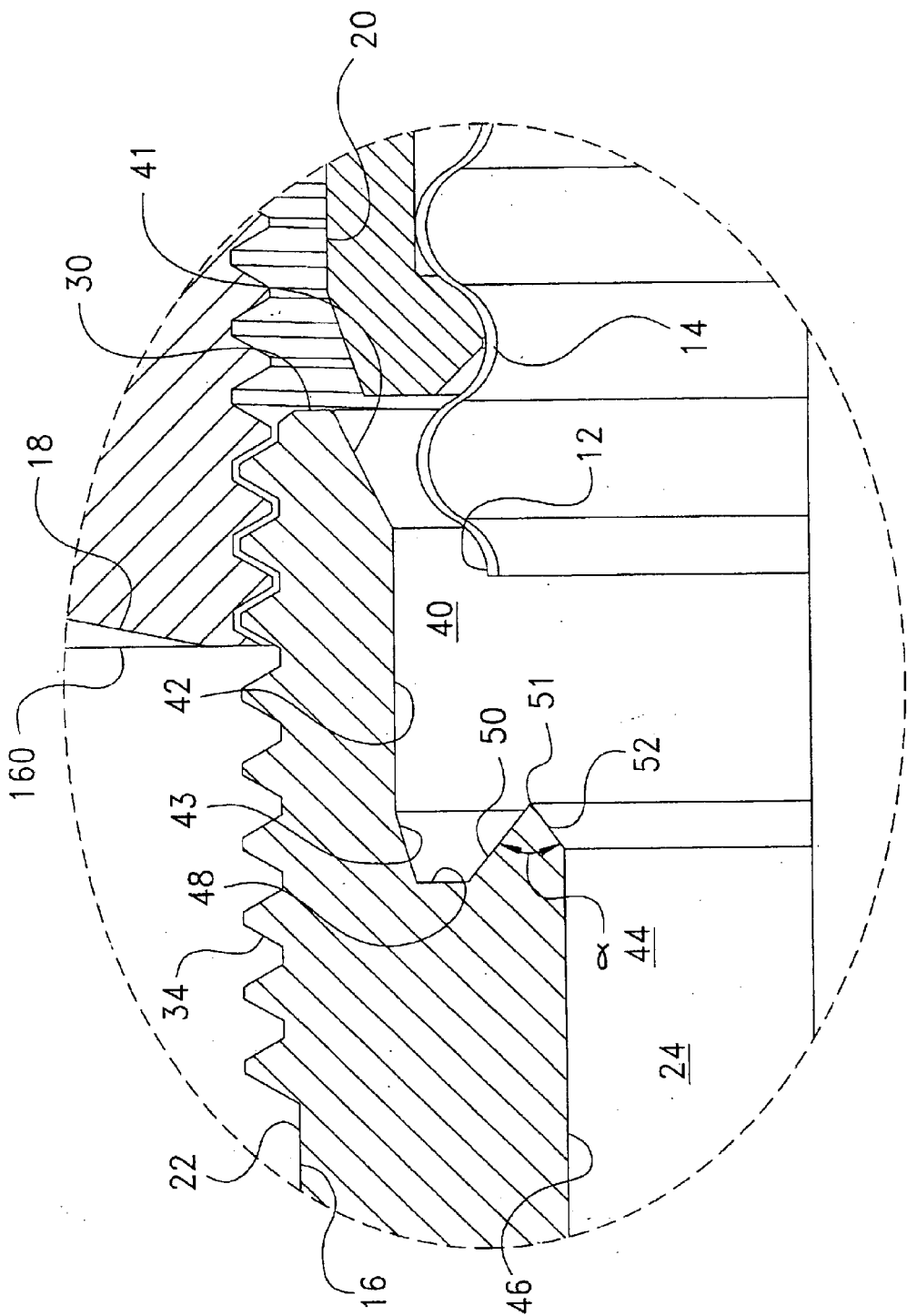
FIG. 2A is an enlarged view of a detail of FIG. 2.
Figure 2B:
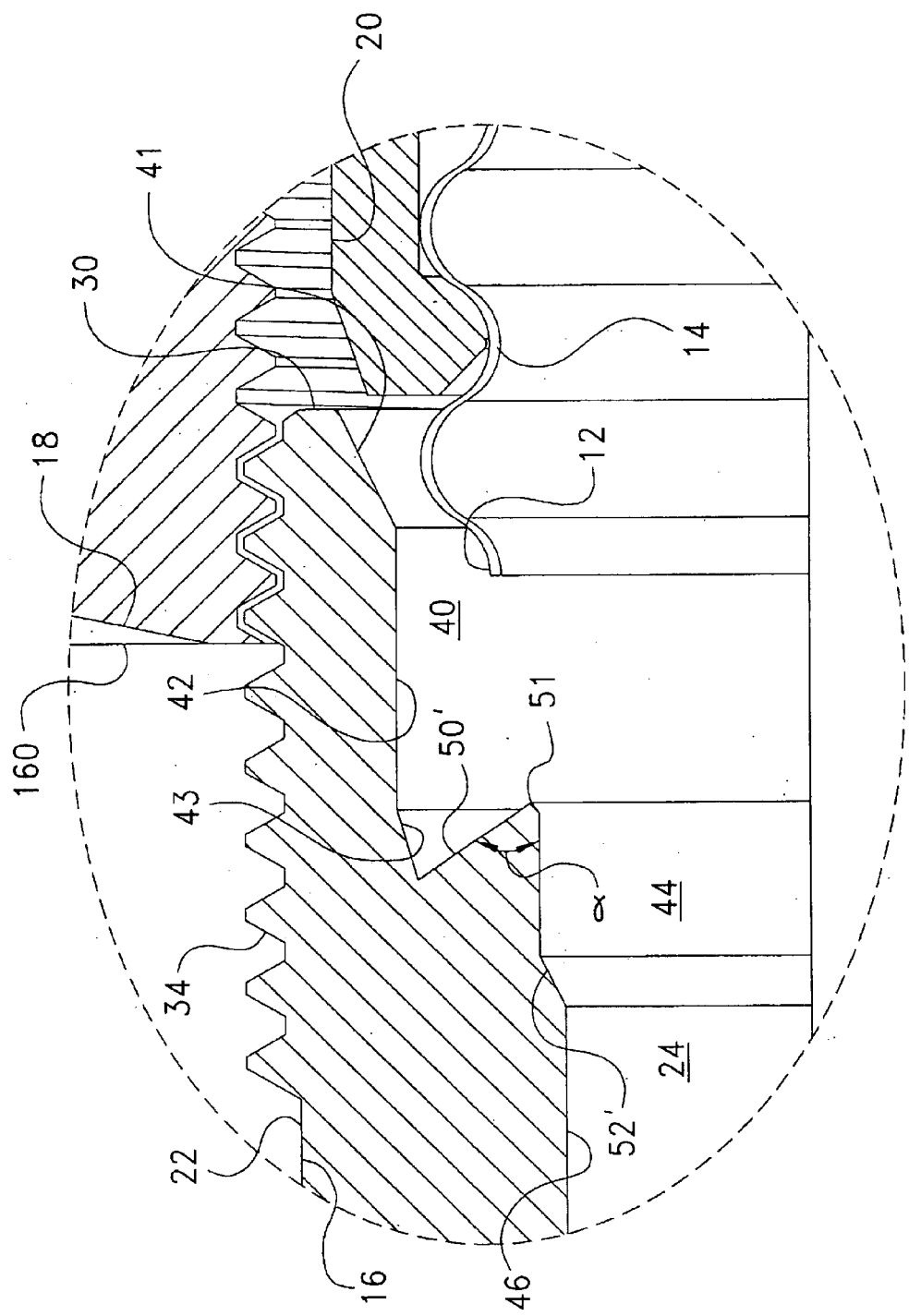
FIG. 2B is a view as in FIG. 2A of an alternative embodiment of the detail of FIG. 2A.

In the embodiment 10 of FIGS. 1 and 2, the body bore 24 is counterbored beginning from the opening of the body rearward end 30 and ending intermediate the rearward end and the opening of the forward end 28 so as to define a larger diameter rearward end portion or socket, 40, having a rearwardly-facing, lead-in chamfer, 41, and inner circumferential surface, 42, which may transition to a rearward taper, 43, and a smaller diameter forward end portion, 44, having an inner circumferential surface, 46, which, as is shown, may be generally cylindrical. The rearward end portion 40 terminates at a generally upstanding, annular end wall, 48, which adjoins the taper 43 and which, in turn, extends radially inwardly in transitioning to a rearwardly-facing, tapered sealing or seating surface, 50, which may have a generally annular, frustoconical geometry in being inclined or angled in the forward axial direction along axis 26. As may be seen best with additional reference to the detail view of FIG. 2A, sealing surface 50 itself may transition by way of a rounded or radiused apex, 51, to a chamfer, 52, so as to define an inside angle, referenced at α, which may be acute, but which alternatively may be obtuse. Also, and as is shown at 52' in the detail view of FIG. 2B, the transition instead may be configured as an undercut. Similarly, and as is shown at 50' in FIG. 2B, sealing surface 50 may extending directly from the surface 42 of the bore rearward end portion 40.

Returning to FIGS. 1 and 2, as defined by the socket surface 42, the opening of the body rearward end 30 is sized to accept the distal end 12 of tubing 14 therethrough. Tubing 14, which typically is constructed of stainless steel or another metal, but which alternatively may be formed of a plastic or other material, may be conventionally formed of a series of sinusoidal corrugations, a first one of which is referenced at 60. These corrugations define alternating crest portions, a first one of which is referenced at 62, which define the outer periphery, i.e., major outer diameter, of tubing 14, and root or trough portions, a first one of which is referenced at 64, which define a minor outer diameter of the tubing. As is shown at 66, distal end 12 of tubing 14 is formed by cutting through, preferably centrally, one of the root portions 64. The tubing 14 conventionally may be jacketed within a polyethylene or other plastic jacket (not shown), with the jacket, prior to the insertion of the tubing into the fitting, being stripped away from at least the first crest and root portions 62 and 64.

Figure 3:
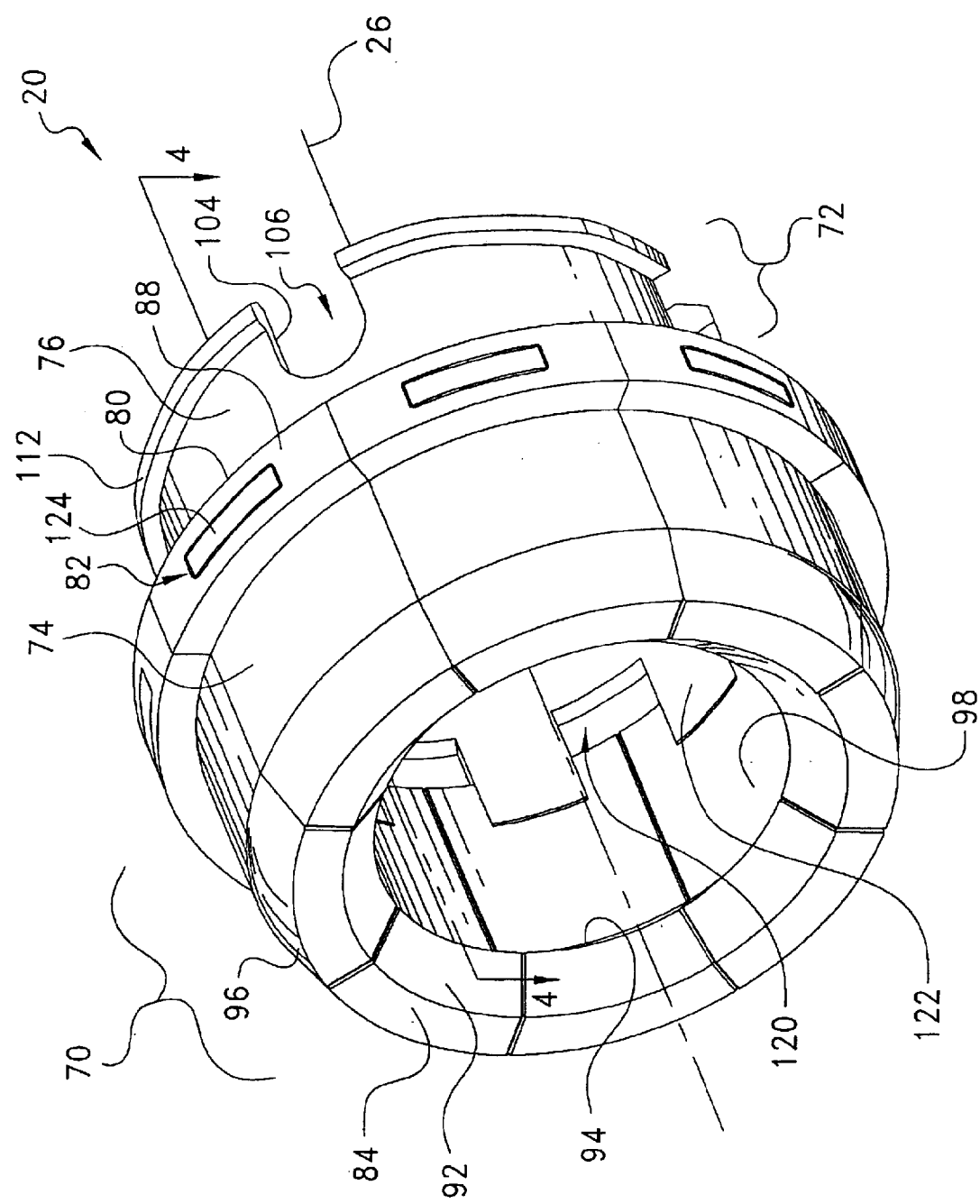
FIG. 3 is perspective view showing the collet of the assembly of FIGS. 1 and 2.

With reference now to the perspective view of FIG. 3 and the cross-sectional view of FIG. 4, collet 20 in the illustrated embodiment is formed as a composite of a forward portion, referenced at 70, and a rearward portion, referenced at 72. The collet forward portion 70 is constructed of a number of individual, arcuate tangs, one of which is referenced at 74, arranged in a series circumferentially about axis 26, with the collet rearward portion 72 being constructed as a generally annular, flexible retaining collar, 76, which resiliently retains the individual tangs 74 of the forward portion 70 in their circumferential arrangement about axis 26.

As arranged in such series, each of the tangs 74 may be generally abutting or adjoining, i.e., the sides thereof are not separated by substantial spaces therebetween, and define a major inner diametric extent of the collet forward portion 70 which may be incrementally larger than the major outer diameter of tubing 14 (FIGS. 1 and 2), so as to allow the tubing distal end 12 to be received coaxially therethrough. In the illustrated embodiment, each of the eight tangs 74 which are shown is of an about equal radial extent which usually would be preferred. The number of tang segments comprising the collet forward portion 70 may vary as generally depending upon the nominal diameter of collet 20, but typically will be at least two and may be eight as shown, or more, or any number therebetween.

Figure 5:
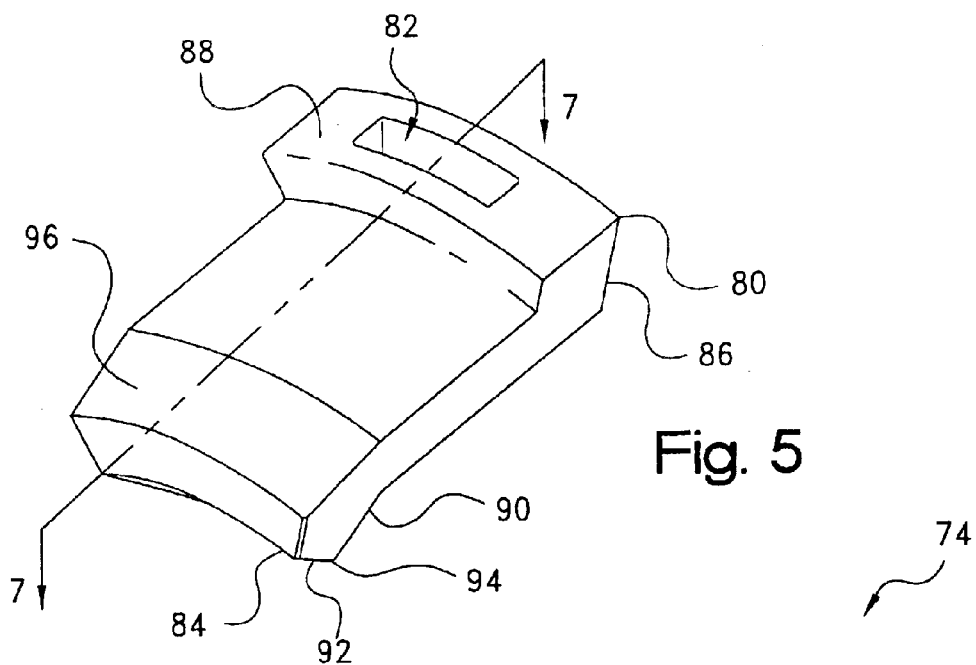
FIG. 5 is a perspective view of one of the tangs of the collet of FIG. 3.
Figure 6:
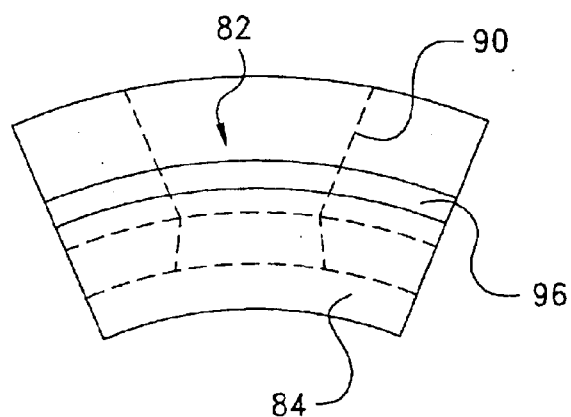
FIG. 6 is a forward end view of the collet tang of FIG. 5.

As may be seen best in the perspective view of tang 74 shown in FIG. 5, each of the arcuate tangs 74 forming the collet forward portion 70 may extend from a rearward end 80, which may be configured, as shown, as a generally upstanding flange, having a slot, 82, therethrough, to a forward end, 84. With additional reference to the forward end and cross-sectional views of the tang 74 shown, respectively, in FIGS. 6 and 7, it may been seen that slot 82 may have a generally L-shaped axial cross-section in extending from the backside, 86, of the rearward end 80, through to the topside, 88, of the end 80. As may be seen in FIG. 6, the portion, 89, of the slot 82 which extends through the topside 88 may have a generally wedged-shaped radial cross-section.

Figure 7:
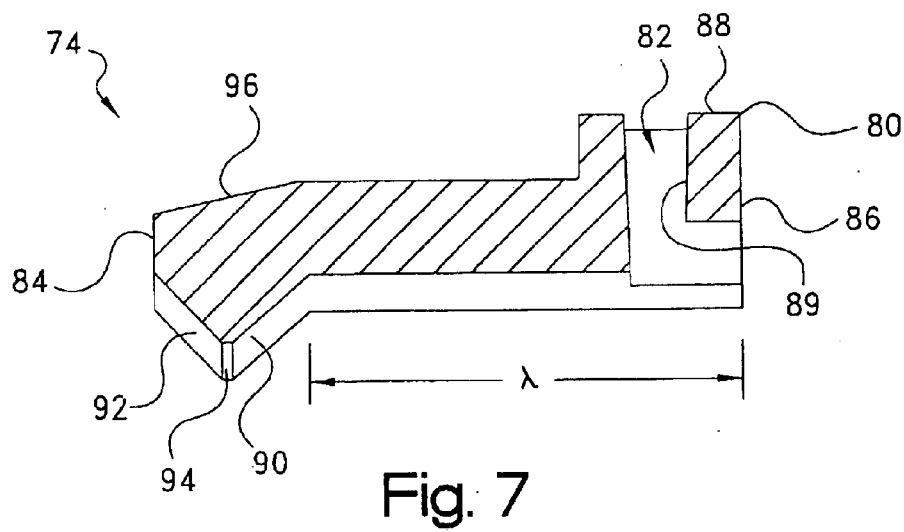
FIG. 7 is a cross-sectional view of the collet tang of FIG. 5 taken through line 7–7 of FIG. 5.

With continuing reference to FIGS. 5 and 7, at the forward end 84, tang 74 may be configured as having rearwardly-facing angled surface, 90, and an adjoining forwardly-facing angled surface, 92, which, at a truncated, flattened, radiused, or other vertex thereof the surfaces 90 and 92, define a radially inwardly-extending, generally conical tooth or other gripping or retaining portion, 94, receivable within a tubing root portion 64 (FIGS. 1 and 2). In the circumferential arrangement of the tangs 74 about the axis 26, and as may be seen best with momentary reference to the forward end view of the collet 20 shown in FIG. 8, the surfaces 92, which may be generally parallel to the body sealing surface 50 in the assembled connection 10 FIG. 12), may form in the normal, unexpanded or closed orientation of the collet 20, a circular, generally conical or frustoconical, annular ring, 95, about the axis 26. Ring 95 defines a minor inner diametric extent of the collet forward portion 70 which may approximate or be incrementally larger than the tubing minor outer diameter, but otherwise smaller than the tubing major outer diameter, such that, when received within one of the tubing root portion 64, the tang retaining portions 94 hold the tubing 14 and thereby delimit the axial movement thereof relative to the collet 20. Advantageously, the shape of such ring 95, which may be generally non-collapsing due to the abutment between the side of each of the tangs with the corresponding side of each adjacent tang, need not deviate substantially from circularity, and in that regard may function as a solid ring to help more reliably seal the tubing end against the body sealing surface.

Returning to FIGS. 5 and 7, the forward end 84 of each of the tangs 74 further may be configured as having an outer chamfered surface, 96, which may form a leading edge of the collet 20. Each of the collet tangs 74 have an extent, referenced at "λ" in FIG. 7, which may be selected to extend over, for example, two or more tubing corrugations. Together with the extents of the other tangs 74, theses extents define a circumferential wall portion, referenced at 98 in FIG. 4, of the collet 20 which, in turn, defines the major inner diametric extent of the collet forward portion 70. Each of the tangs 74, which may be formed of a metal such as brass, may be machined, molded, cast, sintered such as by powdered metallurgy, or, preferably, metal injection molded for more precise dimensional tolerance, or otherwise formed.

Referring again to FIGS. 3 and 4, the collar 76 forming the collet rearward portion 72 may be molded, stamped, machined or otherwise formed of a plastic or, alternatively, of another material such a metal, and is provided to allow for the resilient expansion of the collet forward portion 70 such that the tubing end 14 may received coaxially therethrough. In that regard, the collar 76 may have an inner diametric extent which generally matches the major inner diametric extent of the collet forward portion 70 so as to provide a generally smooth transition therebetween, and which further may be only incrementally larger than the tubing major outer diameter to guide and support the support tubing 14 as the distal end 12 thereof is being inserted into the fitting.

Collar 76 extends along an axial length, referenced at "L" in FIG. 4, from a rearward end, 100, to a forward end, 102. Such length, as with the tang length λ (FIG. 7), may be selected to extend over, for example, two or more tubing corrugations, and defines a circumferential wall portion, referenced at 103 in FIG. 4, of the collar 76.

The collar rearward end 100 may be configured, as shown, as being divided into a series of rearward segments, one of which is referenced at 104, by a corresponding series of notches or other rebates, one of which is referenced at 106. Each of the segments 104, which thereby afford the collar rearward end 100 a degree of resiliency, i.e., to be expanded or collapsed, may have a distal end 108, and a proximal end, 110, and may be formed at the distal end 108 as a shoulder, 112, having a forward surface, 113, and a tapered, rearward surface, 114. As is shown, the shoulder 112 may extend generally continuously about axis 26 intermediate between the rebates 106, although it should be appreciated that the shoulder 112 instead may be interrupted or otherwise discontinuous about the axis 26 between the rebates 106.

Figure 9:
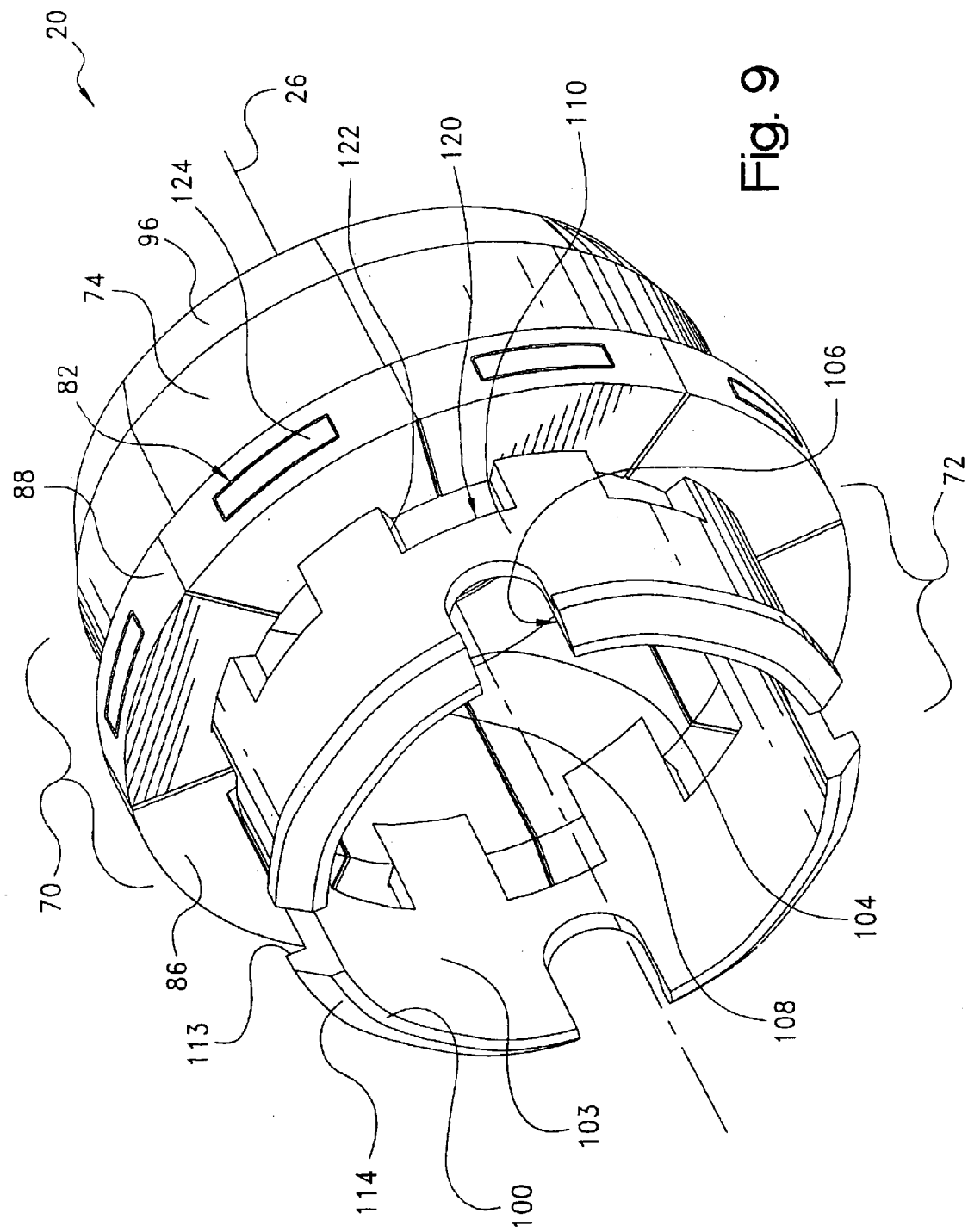
FIG. 9 is a reverse end perspective view of the collet of FIG. 3.

At the forward end 102, collar 76 may be "crenellated," or otherwise notched, indented, or rebated, one of which is referenced at 120, so as to again form a series of forward segments, one of which is referenced at 122, which may correspond in number to the number of tangs 74. As may be seen particularly in the cross-sectional view of FIG. 4 and in the reverse perspective view of FIG. 9, each of the segments 122 may have a generally L-shaped cross-section, and as joined to a corresponding one of the collet forward portion tangs 74, functions as a "living hinge" for biasing the collet forward portion in its normally closed orientation (FIG. 8), while allowing for the resilient expansion or opening of the collet forward portion 70 from such orientation to an expanded or open orientation enlarging the minor inner diametric extent such that the major outer diameter of the tubing end is receivable therethrough. With continuing reference to FIG. 4, an upstanding portion, 124, of each of the forward segments 122 may be molded into, interference or snap fit, bonded, or otherwise joined within a slot 82 of a corresponding one of the tangs 74. As assembled, the forward surface 113 of the collar rearward end 100 is axially spaced-apart as at 126 from the backside surface 86 of the tang rearward ends 80.

Figure 4C:
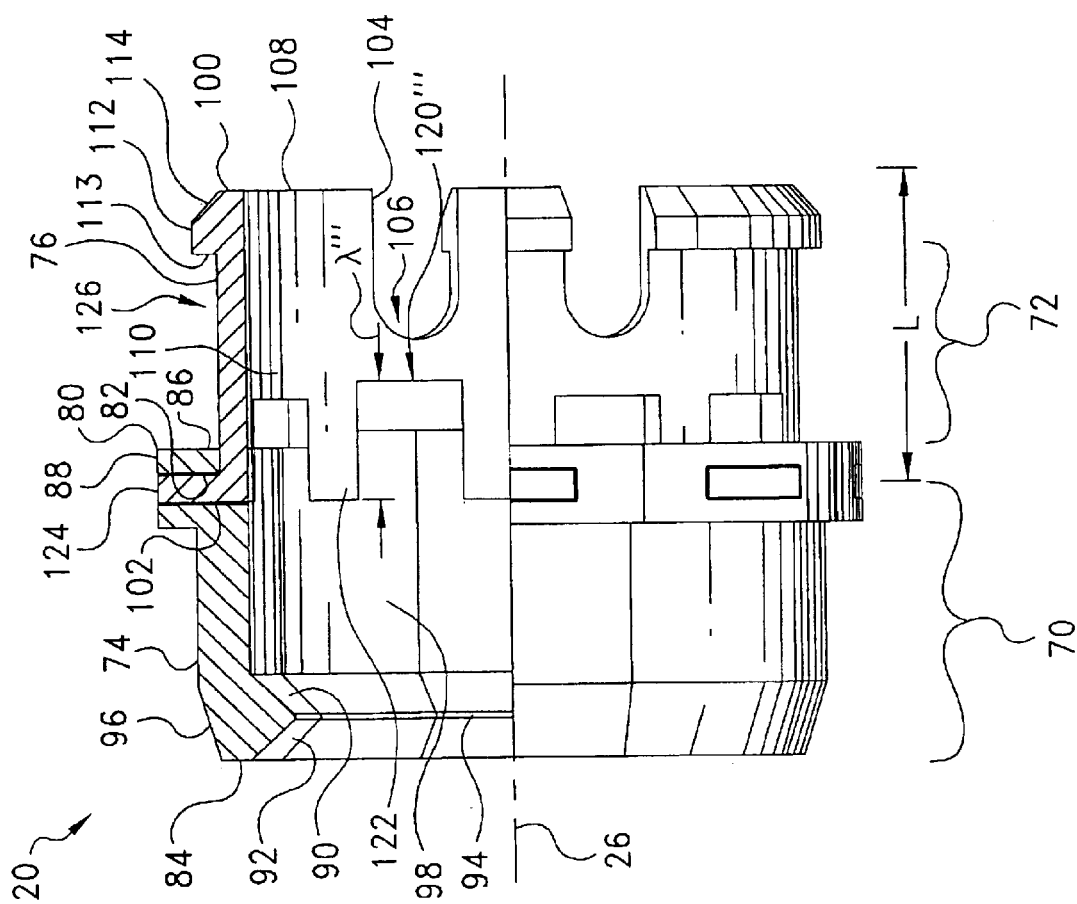
FIG. 4C is a view as in FIG. 4 of another alternative embodiment of the collet of FIG. 4.

Depending upon such factors as the stiffness of the material of construction for the collar 76 and the degree of resiliency or flexibility desired in the expansion of the collet forward portion 70, the depth of the rebates 120 and, accordingly, the effective length, referenced at "λ" in FIG. 4, of the segments 122, may be adjust to achieve the desired response. For example, and as is shown in FIG. 4A, with the collar 76 being formed of a relatively flexible material, such as a plastic, the depth, referenced at "λ'" in FIG. 4A, of the rebates 120, now represented at 120' in FIG. 4A, may be shortened towards the tang backside 86, and may even end generally coterminous therewith, as shown at 120" in FIG. 4B, so as to effectively shorten the length, now referenced at "λ"," of the collar segments 122. In this way, the resiliency of the expansion of the collet forward portion 70 may be increased such as to provide a better tactile "feel" as the tubing end is being inserted. Alternatively, and as is portrayed in FIG. 4C, with the collar 76 being formed of a relatively stiffer material, such as a metal, the depth, referenced at "λ'"," of the rebates 120 may be increased, as is shown at 120'", away from the tang backside 86. In this way, the length of the collar segments 122 may be effectively increased to thereby allow the collet forward portion 70 to be expanded more easily, i.e., without having to unduly force the insertion of the tubing end. Ultimately, by adjusting length of the depth of the rebates 120 and the length of the collar segments 122, differing degrees of flexibility may be achieved for the opening of the tangs 74 in the expansion of the collet forward portion 70.

Returning to FIGS. 1 and 2, fastener 18 in the illustrated embodiment is configured generally as a hexagonal, cap-type nut which may be formed of the same or different metal or other material as the body 16. The fastener 18 is journaled coaxially over the collar rearward end 100, and is seated on the collet 20, such as in the space 126 between the collar forward surface 113 and the tang backside surfaces 86 for a removable, threaded engagement with the body rearward end 30. Fastener 18 thus extends from an open forward end, 130, to a rearward end, 132, which includes a radially inwardly-projecting, primary shoulder portion, 134, having an opening, referenced at 136, which is sized to retain the fastener 18 in the space 126 between the collet surfaces 113 and 86, while allowing for tubing distal end 12 to be received concentrically therethrough the opening 136 and the collet 20. Opening 136 may be sized to be incrementally larger than the outer diameter of the collet collar 76 in the space 126 so as to provide support therefor as the tubing end is inserted, and to assist in keeping the collet and tubing centered within the connection.

Primary shoulder portion 134 defines a forwardly-facing, generally annular end wall, 138, which, together with an adjoining lateral wall, 140, of an adjacent, internal secondary shoulder portion, 142, defines an internal pocket, referenced at 144, which is sized to receive the flanged rearward end 80 of the tangs 74. A forwardly-facing, lead-in chamfer, 146, may be provided on the secondary shoulder portion 142 to help guide the tang ends 80 into the pocket 144 during the make-up of the connection 10. During make-up, the seating of the collet tangs 74 within the pocket 144 assists in keeping the collet tangs closed and seated within the tubing corrugation.

Fastener 18 further may be seen in the views of FIGS. 1 and 2 to have an inner circumferential surface, 150, which is internally threaded, as referenced at 152, at the fastener forward end 130 to be threadably engageable with the external threads 34 of the body rearward end 30. The inner surface 150 otherwise defines the inner diametric extent of the fastener 18 which is sized to provide a clearance with the collet 20 to accommodate the radial outward expansion of the collet tangs 74 as the tubing end 12 is inserted therethrough.

Prior to the insertion of the tubing end and/or the partial threading of the fastener 18 onto the body rearward end 30 for the "pre-assembly" of the connection 10, the fastener 18 and collet 20 may be themselves be pre-assembled such as by inserting the collar rearward end 100 through the fastener opening 136, with the engagement of the collar rearward surface 114 with the opening 136 causing a camming action effecting the resilient collapse of the diameter of the collar rearward end 100, such as may be accommodated through the rebates 106 (FIG. 4), allowing the end 100 to be received through the fastener opening 136. Thereafter, the fastener 18 may be partially threaded onto the body rearward end 30 with the collar rearward end 100 extending rearwardly externally of the fastener 18, and with the fastener 18 being slidably movable intermediate the collet surfaces 113 and 86.

Although optional, it may be preferred for ease of use and to assure proper tube depth insertion that a positive spacing is provided controlling the distance that the fastener 18 is partially threaded onto the body end 30. Such spacing, as is shown in FIGS. 1 and 2, may be provided by a tear-away plastic ring or other spacer, 160, which may be interposed between the fastener forward end 130 and the body flats portion 32, and which may be torn-away or otherwise removed prior to the torquing of the fastener 18. As is shown, such spacer 160 may be sized to axially position the fastener 18 relative to the body sealing surface 50 such that, upon the insertion of the tubing end 12 and the seating of the tang retaining portions 94 within the first tubing root 64, the axial distance, referenced at "s" in FIG. 2, between the sealing surface 50 and the tubing distal end 12 is less than is necessary to further advance the tubing past the second corrugation, referenced at 162, thereof before the engagement of the tubing end 12 against the sealing surface 50. Alternatively, the spacer 160 may be sized such that a positive stop is established by the abutting engagement of the tubing end 12 against the sealing surface 50 upon the collet tangs retaining portions 94 being received within the first tubing root 64. A conventional thread locking material also may be substituted as coated onto the body threads 34 as applied either from the forwardmost and extending rearwardly to a point defining the forward position of the fastener 18 such that the fastener is threaded, such as by hand, onto the uncoated threads with additional torquing requiring a wrench or other tool. The locking material alternatively may be applied to the threads beginning from the rearwardmost and extending forwardly to a point define the forward position of the fastener 18 such that the fastener is threaded onto the coated portion of the threads and is "locked" thereon with additional torquing again requiring a wrench to break the lock. Visual inspection and/or tactile or audible, i.e., a "snap," feedback also may be used to confirm the tube has been inserted the proper amount into the fitting assembly.

Figure 10:
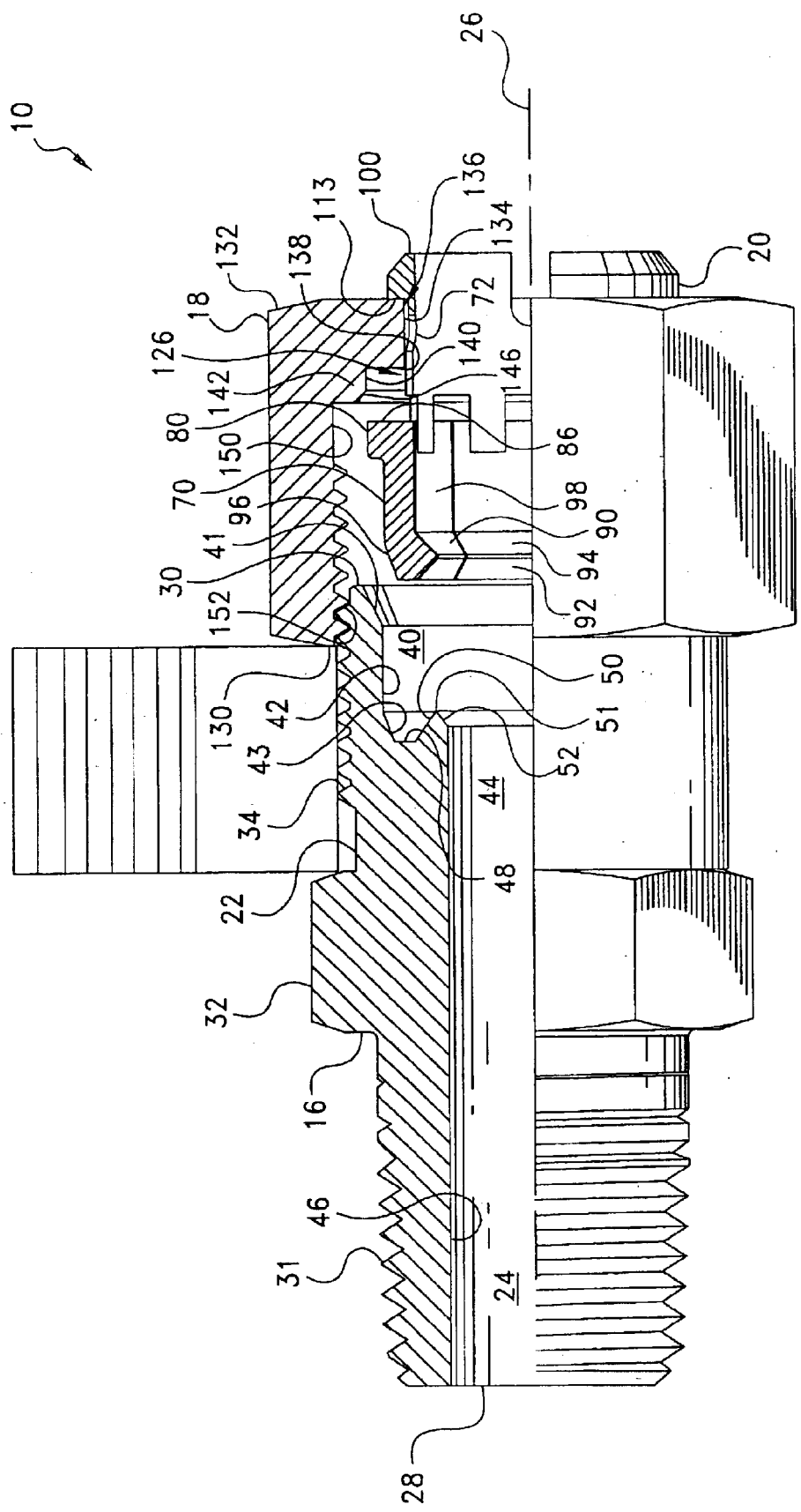
FIG. 10 is a partially cross-sectional, side view showing the fitting componentry of the assembly FIGS. 1 and 2 as pre-assembled for the connection of a tubing end thereto.

Turning now to FIG. 10, the fitting componentry of the connection 10 of FIGS. 1 and 2 reappears as pre-assembled as has been described and prior to the insertion of the tubing end thereinto. For the make-up of the connection 10, and with reference now to FIG. 11, the tubing end 12 may be inserted coaxially though the collet collar rearward end 100 and the fastener opening 136 effecting the expansion or opening of the tangs 74 of the collet forward portion 70 by the camming action developed by the bearing of the tang surface 90 on the first tubing corrugation 60, with the forward advancement of the collet being delimited by the abutting engagement of the collar surface 113 against the fastener shoulder 134. Upon the forward advancement of the crest portion 62 of the first corrugation 60 past the tang retaining portions 94, the tangs 74 resiliently return to their normal, unexpanded state with the retaining portion 94 being receiving within the tubing root 64 as is shown in FIG. 2. Thereupon, the make-up of the connection 10 may be completed by the tearing-away or other removal of the spacer 160, and the tightening of the fastener 18.

Figure 11:
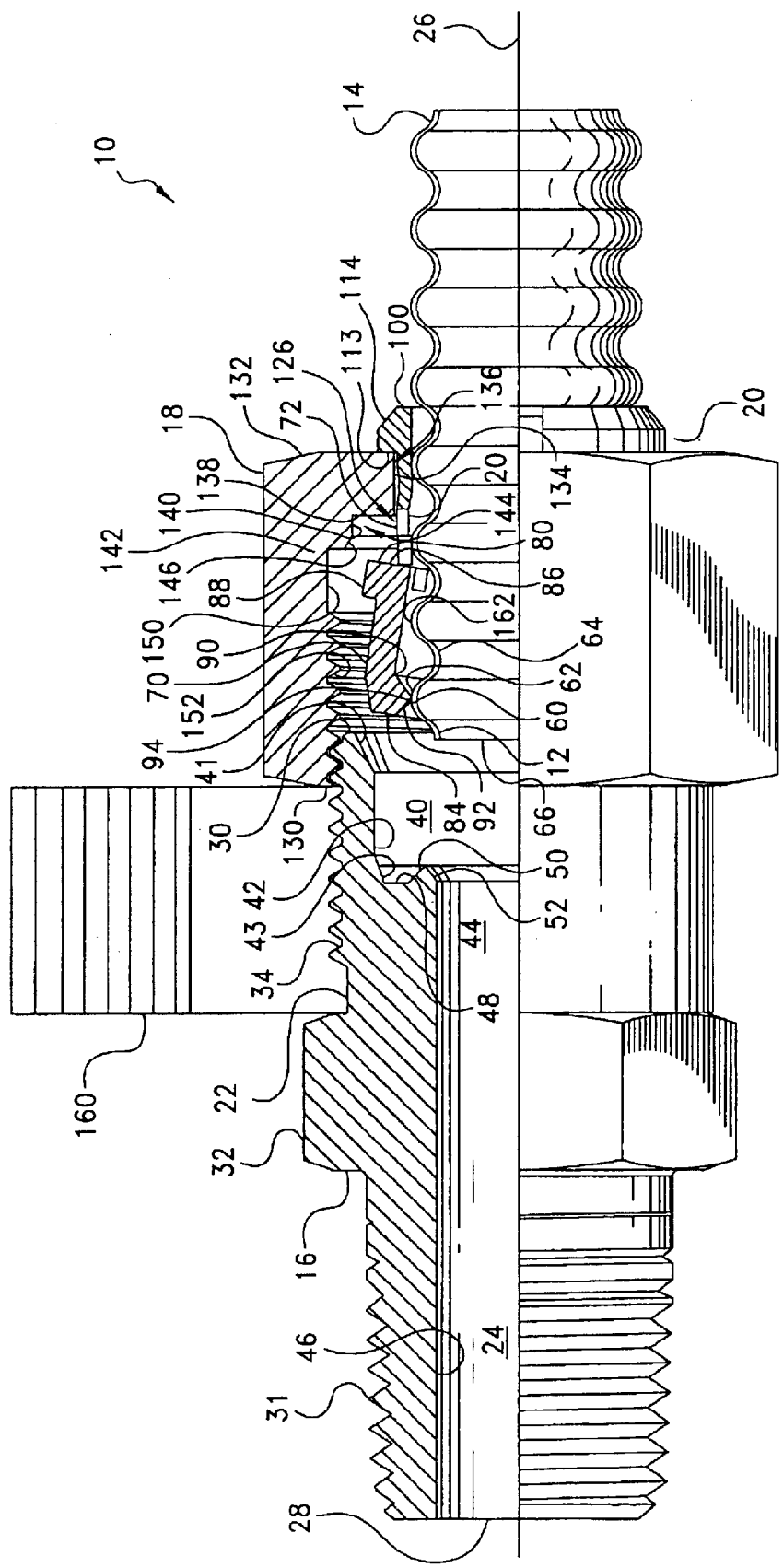
FIG. 11 is a partially cross-sectional, side view showing the initial insertion of a tubing end into the assembly of FIG. 10.
Figure 12:
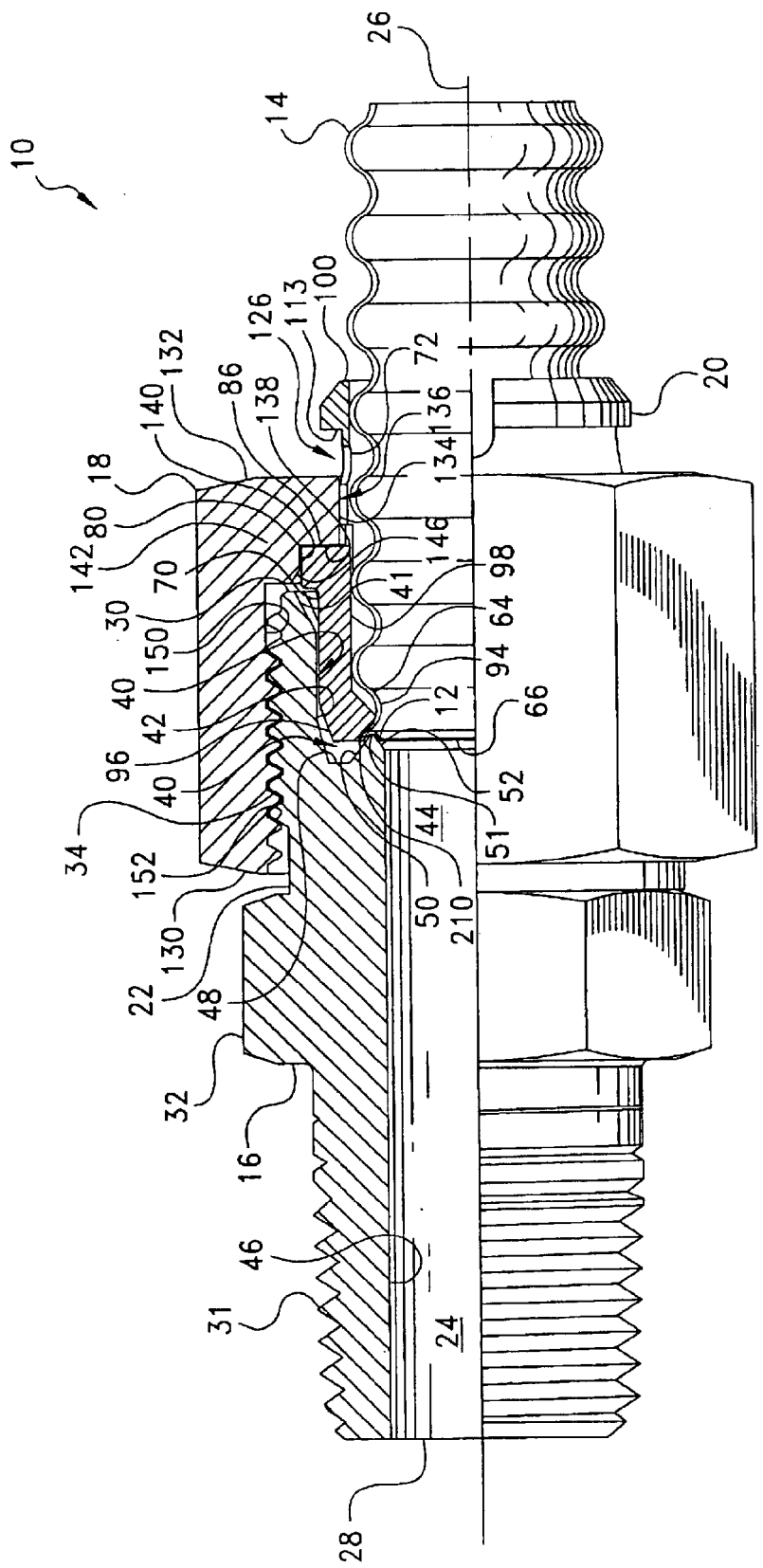
FIG. 12 is a partially cross-sectional, side view showing the completed fitting connection of the assembly of FIG. 2.

As may be appreciated with reference lastly to FIG. 12, as further threaded onto the body rearward end 30, fastener 18 is slidably movable within the space 126 between the collar forward surface 113 and the tang backside surfaces 86 to be advanced forwardly from the orientation shown in FIG. 11 to that shown in FIG. 12 wherein the flanged rearward ends 80 of the tangs 74 are received within the fastener internal pocket 144. Further in such orientation, the fastener end wall 138 abuttably engages the tang backside surface 86 in a force transmitting communication urging the collet 20, along with the retained tubing end 12, forwardly such that the collet tangs 74, as guided by the tang chamfered surfaces 96 and the body lead-in chamfer 41, are lead coaxially along axis 26 into the socket of the body bore rearward end portion 40. Therein, the opening of the collet tangs 74 is constrained by the bore inner circumferential surface 42 which may be sized to have an inner diameter which has a close tolerance with the outer diameter of the collet wall portion 98. The body taper 43, moreover, may provide additional constraint against the opening of the collet tangs 74 as the collet forward portion 70 is continued to be advanced within the socket.

As the make-up of the connection 10 continues, the tubing corrugation 60 is collapsed and compressed between the ring 95 (FIG. 8) formed by the collet tang surfaces 92 and the body sealing surface 50 into the generally flared configuration shown at 210, and effecting a fluid-tight, preferably metal-to-metal seal, seal between such flare 210 and the body surface 50 and the collet ring 95. As the make-up of the connection 10 proceeds from the insertion of the tubing end 12 to the forming of the flare 210, it may be seen that the tubing outer diameter may be closely supported over two or more, and, typically, four or five or more corrugations, by the inner diameter of the collet 20. Such support assists in guiding the tubing end 12 into the body socket 40, and in ensuring that the tubing 14 is centered relative to the body sealing surface 50, and may obviate the need and expense of forming the fitting body 16 as having a separate sleeve or other structure which must be received within the tubing inner diameter as a guide for leading the tubing into the fitting.

In the illustrated embodiment, the diameter of the body apex 51 may be sized to be incrementally larger than the minor outer diameter of the tubing 14 so as to provide a fold-over point intermediate the major and minor outer diameters of the tubing 12 which initiates the inversion of the tubing corrugation 60 into the flare 210. Moreover, as tubing 14 typically is cut to length with a conventional C-clamp type tubing cutter or the like, the cut end 66 of the tubing could potentially scratch or otherwise damage the surface 50. As such damage could affect the fluid-tight seal between the surface 50 and the flare 210, a more reliable seal may be provided by virtue of the described folding over of the flare. Although it has been described that only the first tubing corrugation is compressed, it will be appreciated that any number of corrugations left projecting beyond the collet may be so compressed and collapsed if the fitting componentry is sized accordingly. To disconnect the tubing 14 from the fitting body 16, the connection sequence simply is reversed.

Thus, a unique fitting connection for corrugated tubing is described herein which facilitates and simplifies assembly, and which may be used to achieve a fluid-tight or other secure connection in a single operation.

As was more fully described hereinbefore, materials of construction are to be considered conventional for the uses involved. Such materials generally will be corrosion resistant, but particularly will depend upon the fluid or fluids being handled. For most of the componentry, and except as was otherwise stated, metal materials such as a mild or stainless steel or brass may be preferred for durability, although other types of materials such as plastics may be substituted, however, again as selected for compatibility with the fluid being transferred or for desired mechanical properties.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:
1. An assembly comprising:
   a length of tubing having a distal end, the tubing having corrugations formed of alternating crest portions defining a major outer diameter of the tubing, and root portions defining a minor outer diameter of the tubing;

a body having a socket for receiving the tubing distal end coaxially therein, the socket having an inner circumferential surface and an external surface, and extending in a forward axial direction along a central longitudinal axis from an opening in the body to an internal sealing surface, the sealing surface extending radially about the axis and facing in a rearward axial direction opposite the forward axial direction;

a generally annular collet receivable coaxially over the tubing distal end, the collet having a forward portion and a rearward portion, the collet forward portion comprising at least a pair of arcuate tangs arranged in a series circumferentially about the axis to form a circumferential wall portion defining a major inner diameter of the collet forward portion larger than the tubing major outer diameter, each of the tangs extending along the axis from a rearward end to a forward end, and being configured at the forward end to define a radially-inwardly extending retaining portion receivable within a root portion of the tubing, the retaining portions of each of the tangs extending circumferentially about the axis and defining in a normally-closed closed orientation of the collet forward portion a minor inner diameter thereof smaller than the tubing major outer diameter, and the collet rearward portion extending along the axis from a radially-outwardly extending rearward shoulder to at least a pair of forward segments each hingedly connected to a rearward end of a corresponding one of the collet tangs, the collet forward portion being expansible, responsive to the bearing of the retaining portions of the tangs on the tubing crest portions as the collet is received coaxially over the tubing end, from its closed orientation by the hinging of the forward segments into an open orientation allowing the tang retaining portions to pass over the tubing major outer diameter; and a fastener journalled coaxially over the collet, the fastener extending along the axis from an open forward end partially threadably engageable with the body external surface to position the collet forward portion at a given axial distance from the body sealing surface prior to the tubing end being inserted through the collet rearward portion, to a rearward end configured as having a radially-inwardly projecting primary shoulder having an opening seated coaxially on the collet rearward portion intermediate the shoulder thereof and the tang rearward ends, and being abuttingly engageable, as the fastener is tightened on the body external surface, with the collet tang rearward ends drawing the collet and the retained tubing end forwardly into the body socket towards the body sealing surface, the fastener having an inner radial surface sized to accommodate the expansion of the collet forward portion from its closed orientation to its open orientation as the tubing distal end is inserted forwardly through the collet rearward portion into retention within the collet with at least a first one of the tubing corrugations being interposed between the collet forward end and the body sealing surface, and with the tang retaining portions being received in the closed orientation of the collet forward portion within a corresponding one of the tubing root portions, at least the first one of the tubing corrugations being collapsible in a sealing engagement between the collet forward portion and the body sealing surface as the fastener is tightened.

2. The assembly of claim 1 wherein the circumferential wall portion of the collet tangs has an axial length which spans at least two of the tubing crest portions.

3. The assembly of claim 1 wherein the collet rearward portion has an axial length which spans at least two of the tubing crest portions.

4. The assembly of claim 1 wherein the collet rearward portion shoulder is separated into at least a pair of rearward segments, the rearward segments being resiliently collapsible allowing the shoulder to be received through the fastener opening for the opening to be passed forwardly over the shoulder in being seated on the collet rearward portion.

5. The assembly of claim 4 wherein the collet rearward portion shoulder has a rearward surface, the rearward segments being collapsible responsive to a camming engagement of the of the shoulder rearward surface against the fastener opening.

6. The assembly of claim 1 wherein the fastener primary shoulder has a forwardly-facing end wall, and wherein the fastener rearward end is further configured as having a radially-inwardly projecting secondary shoulder adjacent the primary shoulder, the secondary shoulder having a radially-inwardly facing lateral surface which together with the primary shoulder end wall defines an internal pocket sized to retain the tang rearward ends delimiting the opening of the collet forward end as the collet is drawn forwardly towards the body sealing surface.

7. The assembly of claim 1 wherein in the closed orientation of the collet forward portion, each of the tangs abuttingly engages each adjacent tang such that the collet forward portion is substantially non-collapsing in its closed orientation.

8. The assembly of claim 7 wherein each of the tang retaining portions has a forwardly-facing surface which together with the forwardly-facing surfaces of the other tang retaining portions defines a generally solid, circular ring about the axis, at least the first one of the tubing corrugations being collapsed between the ring and the body sealing surface as the fastener is tightened.

9. The assembly of claim 1 wherein:
each of the tang rearward ends has a rearwardly-facing backside surface; and
each of the forward segments of the collet rearward portion has an axial length which extends rearwardly beyond the backside surfaces of the tang rearward ends.

10. The assembly of claim 1 wherein:
each of the tang rearward ends has a rearwardly-facing backside surface; and
each of the forward segments of the collet rearward portion has an axial length which ends rearwardly generally coterminous with the backside surfaces of the tang rearward ends.

11. An assembly comprising:
a length of tubing having a distal end, the tubing having corrugations formed of alternating crest portions defining a major outer diameter of the tubing, and root portions defining a minor outer diameter of the tubing;

a body having a socket for receiving the tubing distal end coaxially therein, the socket having an inner circumferential surface and an external surface, and extending in a forward axial direction along a central longitudinal axis from an opening in the body to an internal sealing surface, the sealing surface extending radially about the axis and facing in a rearward axial direction opposite the forward axial direction;

a generally annular collet receivable coaxially over the tubing distal end, the collet having a forward portion and a rearward portion, the collet forward portion comprising at least a pair of arcuate tangs arranged in a series circumferentially about the axis to form a circumferential wall portion defining a major inner diameter of the collet forward portion larger than the tubing major outer diameter, each of the tangs extending along the axis from a rearward end to a forward end, and being configured at the forward end to define a radially-inwardly extending retaining portion receivable within a root portion of the tubing, and at the rearward end as a flange having a slot therethrough, the retaining portions of each of the tangs extending circumferentially about the axis and defining in a normally-closed closed orientation of the collet forward portion a minor inner diameter thereof smaller than the tubing major outer diameter, and the collet rearward portion extending along the axis from a radially-outwardly extending rearward shoulder to at least a pair of hingable forward segments each received within a corresponding one of the slots to be connected to the rearward end of a corresponding one of the collet tangs, the collet forward portion being expansible, responsive to the bearing of the retaining portions of the tangs on the tubing crest portions as the collet is received coaxially over the tubing end, from its closed orientation by the hinging of the forward segments into an open orientation allowing the tang retaining portions to pass over the tubing major outer diameter; and a fastener journalled coaxially over the collet, the fastener extending along the axis from an open forward end partially threadably engageable with the body external surface to position the collet forward portion at a given axial distance from the body sealing surface prior to the tubing end being inserted through the collet rearward portion, to a rearward end configured as having a radially-inwardly projecting primary shoulder having an opening seated coaxially on the collet rearward portion intermediate the shoulder thereof and the tang rearward ends, and being abuttingly engageable, as the fastener is tightened on the body external surface, with the collet tang rearward ends drawing the collet and the retained tubing end forwardly into the body socket towards the body sealing surface, the fastener having an inner radial surface sized to accommodate the expansion of the collet forward portion from its closed orientation to its open orientation as the tubing distal end is inserted forwardly through the collet rearward portion into retention within the collet with at least a first one of the tubing corrugations being interposed between the collet forward end and the body sealing surface, and with the tang retaining portions being received in the closed orientation of the collet forward portion within a corresponding one of the tubing root portions, at least the first one of the tubing corrugations being collapsible in a sealing engagement between the collet forward portion and the body sealing surface as the fastener is tightened.

12. The assembly of claim 11 wherein each of the tang rearward ends has a rearwardly-facing backside surface, the slot extending into the tang backside surface, and the collet rearward portion forward segments extending into the slots though the tang backside surfaces.

13. The assembly of claim 12 wherein each of the tang rearward ends has a radially-outwardly facing topside surface, the slot further extending in the direction of the tang topside surface and the collet rearward portion forward segments further extending into slots in the direction of the tang topside surfaces.

14. An assembly for connecting a length of corrugated tubing, the tubing having corrugations formed of alternating crest portions defining a major outer diameter of the tubing, and root portions defining a minor outer diameter of the tubing, the assembly comprising:

a body having a socket for receiving the tubing distal end coaxially therein, the socket having an inner circumferential surface and an external surface, and extending in a forward axial direction along a central longitudinal axis from an opening in the body to an internal sealing surface, the sealing surface extending radially about the axis and facing in a rearward axial direction opposite the forward axial direction;

a generally annular collet receivable coaxially over the tubing distal end, the collet having a forward portion and a rearward portion, the collet forward portion comprising at least a pair of arcuate tangs arranged in a series circumferentially about the axis to form a circumferential wall portion defining a major inner diameter of the collet forward portion larger than the tubing major outer diameter, each of the tangs extending along the axis from a rearward end to a forward end, and being configured at the forward end to define a radially-inwardly extending retaining portion receivable within a root portion of the tubing, the retaining portions of each of the tangs extending circumferentially about the axis and defining in a normally-closed closed orientation of the collet forward portion a minor inner diameter thereof smaller than the tubing major outer diameter, and the collet rearward portion extending along the axis from a radially-outwardly extending rearward shoulder to at least a pair of forward segments each hingedly connected to a rearward end of a corresponding one of the collet tangs, the collet forward portion being expansible, responsive to the bearing of the retaining portions of the tangs on the tubing crest portions as the collet is received coaxially over the tubing end, from its closed orientation by the hinging of the forward segments into an open orientation allowing the tang retaining portions to pass over the tubing major outer diameter; and a fastener journalled coaxially over the collet, the fastener extending along the axis from an open forward end partially threadably engageable with the body external surface to position the collet forward portion at a given axial distance from the body sealing surface prior to the tubing end being inserted through the collet rearward portion, to a rearward end configured as having a radially-inwardly projecting primary shoulder having an opening seated coaxially on the collet rearward portion intermediate the shoulder thereof and the tang rearward ends, and being abuttingly engageable, as the fastener is tightened on the body external surface, with the collet tang rearward ends drawing the collet and the retained tubing end forwardly into the body socket towards the body sealing surface, the fastener having an inner radial surface sized to accommodate the expansion of the collet forward portion from its closed orientation to its open orientation as the tubing distal end is inserted forwardly through the collet rearward portion into retention within the collet with at least a first one of the tubing corrugations being interposed between the collet forward end and the body sealing surface, and with the tang retaining portions being received in the closed orientation of the collet forward portion within a corresponding one of the tubing root portions, at least the first one of the tubing corrugations being collapsible in a sealing engagement between the collet forward portion and the body sealing surface as the fastener is tightened.

15. The assembly of claim 14 wherein the circumferential wall portion of the collet tangs has an axial length which spans at least two of the tubing crest portions.

16. The assembly of claim 14 wherein the collet rearward portion has an axial length which spans at least two of the tubing crest portions.

17. The assembly of claim 14 wherein the collet rearward portion shoulder is separated into at least a pair of rearward segments, the rearward segments being resiliently collapsible allowing the shoulder to be received through the fastener opening for the opening to be passed forwardly over the shoulder in being seated on the collet rearward portion.

18. The assembly of claim 17 wherein the collet rearward portion shoulder has a rearward surface, the rearward segments being collapsible responsive to a camming engagement of the of the shoulder rearward surface against the fastener opening.

19. The assembly of claim 14 wherein the fastener primary shoulder has a forwardly-facing end wall, and wherein the fastener rearward end is further configured as having a radially-inwardly projecting secondary shoulder adjacent the primary shoulder, the secondary shoulder having a radially-inwardly facing lateral surface which together with the primary shoulder end wall defines an internal pocket sized to retain the tang rearward ends delimiting the opening of the collet forward end as the collet is drawn forwardly towards the body sealing surface.

20. The assembly of claim 14 wherein in the closed orientation of the collet forward portion, each of the tangs abuttingly engages each adjacent tang such that the collet forward portion is substantially non-collapsing in its closed orientation.

21. The assembly of claim 20 wherein each of the tang retaining portions has a forwardly-facing surface which together with the forwardly-facing surfaces of the other tang retaining portions defines a generally solid, circular ring about the axis, at least the first one of the tubing corrugations being collapsed between the ring and the body sealing surface as the fastener is tightened.

22. The assembly of claim 14 wherein:
each of the tang rearward ends has a rearwardly-facing backside surface; and
each of the forward segments of the collet rearward portion has an axial length which extends rearwardly beyond the backside surfaces of the tang rearward ends.

23. The assembly of claim 14 wherein:
each of the tang rearward ends has a rearwardly-facing backside surface; and
each of the forward segments of the collet rearward portion has an axial length which ends rearwardly generally coterminous with the backside surfaces of the tang rearward ends.

24. An assembly for connecting a length of corrugated tubing, the tubing having corrugations formed of alternating crest portions defining a major outer diameter of the tubing, and root portions defining a minor outer diameter of the tubing, the assembly comprising:
a body having a socket for receiving the tubing distal end coaxially therein, the socket having an inner circumferential surface and an external surface, and extending in a forward axial direction along a central longitudinal axis from an opening in the body to an internal sealing surface, the sealing surface extending radially about the axis and facing in a rearward axial direction opposite the forward axial direction;
a generally annular collet receivable coaxially over the tubing distal end, the collet having a forward portion and a rearward portion,
the collet forward portion comprising at least a pair of arcuate tangs arranged in a series circumferentially about the axis to form a circumferential wall portion defining a major inner diameter of the collet forward portion larger than the tubing major outer diameter, each of the tangs extending along the axis from a rearward end to a forward end, and being configured at the forward end to define a radially-inwardly extending retaining portion receivable within a root portion of the tubing, and at the rearward end as a flange having a slot therethrough, the retaining portions of each of the tangs extending circumferentially about the axis and defining in a normally-closed closed orientation of the collet forward portion a minor inner diameter thereof smaller than the tubing major outer diameter, and
the collet rearward portion extending along the axis from a radially-outwardly extending rearward shoulder to at least a pair of hingable forward segments each received within a corresponding one of the slots to be connected to the rearward end of a corresponding one of the collet tangs, the collet forward portion being expansible, responsive to the bearing of the retaining portions of the tangs on the tubing crest portions as the collet is received coaxially over the tubing end, from its closed orientation by the hinging of the forward segments into an open orientation allowing the tang retaining portions to pass over the tubing major outer diameter; and
a fastener journalled coaxially over the collet, the fastener extending along the axis from an open forward end partially threadably engageable with the body external surface to position the collet forward portion at a given axial distance from the body sealing surface prior to the tubing end being inserted through the collet rearward portion, to a rearward end configured as having a radially-inwardly projecting primary shoulder having an opening seated coaxially on the collet rearward portion intermediate the shoulder thereof and the tang rearward ends, and being abuttingly engageable, as the fastener is tightened on the body external surface, with the collet tang rearward ends drawing the collet and the retained tubing end forwardly into the body socket towards the body sealing surface, the fastener having an inner radial surface sized to accommodate the expansion of the collet forward portion from its closed orientation to its open orientation as the tubing distal end is inserted forwardly through the collet rearward portion into retention within the collet with at least a first one of the tubing corrugations being interposed between the collet forward end and the body sealing surface, and with the tang retaining portions being received in the closed orientation of the collet forward portion within a corresponding one of the tubing root portions, at least the first one of the tubing corrugations being collapsible in a sealing engagement between the collet forward portion and the body sealing surface as the fastener is tightened.

25. The assembly of claim 24 wherein each of the tang rearward ends has a rearwardly-facing backside surface, the slot extending into the tang backside surface, and the collet rearward portion forward segments extending into the slots though the tang backside surfaces.

26. The assembly of claim 25 wherein each of the tang rearward ends has a radially-outwardly facing topside surface, the slot further extending in the direction of the tang topside surface and the collet rearward portion forward segments further extending into slots in the direction of the tang topside surfaces.

27. An assembly for connecting a length of corrugated tubing, the tubing having corrugations formed of alternating crest portions defining a major outer diameter of the tubing, and root portions defining a minor outer diameter of the tubing, the assembly comprising:

a body having a socket for receiving the tubing distal end coaxially therein, the socket having an inner circumferential surface and an external surface, and extending in a forward axial direction along a central longitudinal axis from an opening in the body to an internal sealing surface, the sealing surface extending radially about the axis and facing in a rearward axial direction opposite the forward axial direction;

a generally annular collet receivable coaxially over the tubing distal end, the collet having a forward portion and a rearward portion, the collet forward portion comprising at least a pair of arcuate tangs arranged in a series circumferentially about the axis to form a circumferential wall portion defining a major inner diameter of the collet forward portion larger than the tubing major outer diameter, each of the tangs extending along the axis from a rearward end to a forward end, and being configured at the forward end to define a radially-inwardly extending retaining portion receivable within a root portion of the tubing, the retaining portions of each of the tangs extending circumferentially about the axis and defining in a normally-closed closed orientation of the collet forward portion a minor inner diameter thereof smaller than the tubing major outer diameter, and the collet rearward portion extending along the axis from a radially-outwardly extending rearward shoulder to at least a pair of hingable forward segments each connected to a rearward end of a corresponding one of the collet tangs, the collet rearward portion shoulder being spaced-apart from the tang rearward ends to define an axial space therebetween, and the collet forward portion being expansible, responsive to the bearing of the retaining portions of the tangs on the tubing crest portions as the collet is received coaxially over the tubing end, from its closed orientation by the hinging of the forward segments into an open orientation allowing the tang retaining portions to pass over the tubing major outer diameter, and a fastener journalled coaxially over the collet, the fastener extending along the axis from an open forward end partially threadably engageable with the body external surface to position the collet forward portion at a given axial distance from the body sealing surface prior to the tubing end being inserted through the collet rearward portion, to a rearward end configured as having a radially-inwardly projecting primary shoulder having an opening seated coaxially on the collet rearward portion intermediate the shoulder thereof and the tang rearward ends, and being abuttingly engageable, as the fastener is tightened on the body external surface, with the collet tang rearward ends drawing the collet and the retained tubing end forwardly into the body socket towards the body sealing surface, the fastener having an inner radial surface sized to accommodate the expansion of the collet forward portion from its closed orientation to its open orientation as the tubing distal end is inserted forwardly through the collet rearward portion into retention within the collet with at least a first one of the tubing corrugations being interposed between the collet forward end and the body sealing surface, and with the tang retaining portions being received in the closed orientation of the collet forward portion within a corresponding one of the tubing root portions, at least the first one of the tubing corrugations being collapsible in a sealing engagement between the collet forward portion and the body sealing surface as the fastener is tightened, the fastener being movable within the axial space defined in the collet from a rearward position wherein the collet shoulder abuttably engages the fastener primary shoulder delimiting the forward advancement of the collet as the tubing end is inserted forwardly through the collet rearward portion, to a forward position wherein the fastener primary shoulder abuttably engages the collet tang rearward ends.

28. An assembly comprising:

a length of tubing having a distal end, the tubing having corrugations formed of alternating crest portions defining a major outer diameter of the tubing, and root portions defining a minor outer diameter of the tubing;

a body having a socket for receiving the tubing distal end coaxially therein, the socket having an inner circumferential surface and an external surface, and extending in a forward axial direction along a central longitudinal axis from an opening in the body to an internal sealing surface, the sealing surface extending radially about the axis and facing in a rearward axial direction opposite the forward axial direction;

a generally annular collet receivable coaxially over the tubing distal end, the collet having a forward portion and a rearward portion, the collet forward portion comprising at least a pair of arcuate tangs arranged in a series circumferentially about the axis to form a circumferential wall portion defining a major inner diameter of the collet forward portion larger than the tubing major outer diameter, each of the tangs extending along the axis from a rearward end to a forward end, and being configured at the forward end to define a radially-inwardly extending retaining portion receivable within a root portion of the tubing, the retaining portions of each of the tangs extending circumferentially about the axis and defining in a normally-closed closed orientation of the collet forward portion a minor inner diameter thereof smaller than the tubing major outer diameter, and the collet rearward portion extending along the axis from a radially-outwardly extending rearward shoulder to at least a pair of hingable forward segments each connected to a rearward end of a corresponding one of the collet tangs, the collet rearward portion shoulder being spaced-apart from the tang rearward ends to define an axial space therebetween, and the collet forward portion being expansible, responsive to the bearing of the retaining portions of the tangs on the tubing crest portions as the collet is received coaxially over the tubing end, from its closed orientation by the hinging of the forward segments into an open orientation allowing the tang retaining portions to pass over the tubing major outer diameter; and a fastener journalled coaxially over the collet, the fastener extending along the axis from an open forward end partially threadably engageable with the body external surface to position the collet forward portion at a given axial distance from the body sealing surface prior to the tubing end being inserted through the collet rearward portion, to a rearward end configured as having a radially-inwardly projecting primary shoulder having an opening seated coaxially on the collet rearward portion intermediate the shoulder thereof and the tang rearward ends, and being abuttingly engageable, as the fastener is tightened on the body external surface, with the collet tang rearward ends drawing the collet and the retained tubing end forwardly into the body socket towards the body sealing surface, the fastener having an inner radial surface sized to accommodate the expansion of the collet forward portion from its closed orientation to its open orientation as the tubing distal end is inserted forwardly through the collet rearward portion into retention within the collet with at least a first one of the tubing corrugations being interposed between the collet forward end and the body sealing surface, and with the tang retaining portions being received in the closed orientation of the collet forward portion within a corresponding one of the tubing root portions, at least the first one of the tubing corrugations being collapsible in a sealing engagement between the collet forward portion and the body sealing surface as the fastener is tightened, the fastener being movable within the axial space defined in the collet from a rearward position wherein the collet shoulder abuttably engages the fastener primary shoulder delimiting the forward advancement of the collet as the tubing end is inserted forwardly through the collet rearward portion, to a forward position wherein the fastener primary shoulder abuttably engages the collet tang rearward ends.

* * * * *